United States Patent
Li et al.

(10) Patent No.: US 12,013,759 B2
(45) Date of Patent: Jun. 18, 2024

(54) METHOD FOR DELETING SAFETY SERVICE AND ELECTRONIC DEVICE

(71) Applicant: Huawei Technologies Co., Ltd., Shenzhen (CN)

(72) Inventors: Zhuofei Li, Beijing (CN); Min Peng, Beijing (CN); Gaosheng Yin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 17/292,164

(22) PCT Filed: Nov. 13, 2019

(86) PCT No.: PCT/CN2019/117822
§ 371 (c)(1),
(2) Date: May 7, 2021

(87) PCT Pub. No.: WO2020/098664
PCT Pub. Date: May 22, 2020

(65) Prior Publication Data
US 2021/0397518 A1    Dec. 23, 2021

(30) Foreign Application Priority Data

Nov. 14, 2018  (CN) .......................... 201811352889.4
Dec. 28, 2018  (CN) .......................... 201811625740.9

(51) Int. Cl.
*G06F 21/53*        (2013.01)
*G06F 11/14*        (2006.01)
(Continued)

(52) U.S. Cl.
CPC ........ *G06F 11/143* (2013.01); *G06F 11/1441* (2013.01); *G06F 21/51* (2013.01);
(Continued)

(58) Field of Classification Search
CPC ........ G06F 11/1441; G06F 1/24; G06F 21/51; G06F 21/53; G06F 21/629; G06F 2221/2143
See application file for complete search history.

(56) References Cited

U.S. PATENT DOCUMENTS

2012/0238206 A1*  9/2012  Singh .................. G06F 21/6209
                                                        455/41.1
2013/0109308 A1*  5/2013  Singh ...................... H04W 4/50
                                                        455/41.1
(Continued)

FOREIGN PATENT DOCUMENTS

CN      101459902 A      6/2009
CN      103699420 A      4/2014
(Continued)

*Primary Examiner* — Trong H Nguyen
(74) *Attorney, Agent, or Firm* — Conley Rose, P.C.

(57) ABSTRACT

A method includes receiving, by an electronic device, an instruction for wiping data or performing a factory reset, setting an identifier according to the instruction, shutting down or restarting electronic device, reading the identifier when the electronic device is powered on or is connected to a network, sending a request to a server to request the server to delete a security service from a secure element (SE), receiving a command from the server, where the command instructs the electronic device to delete a target security service from the SE, and the target security service is based on a security service installed in the SE and a list of deletable security services stored in the server, and deleting, a secure element applet corresponding to the target security service from the SE according to the first command.

20 Claims, 8 Drawing Sheets

(51) Int. Cl.
*G06F 21/51* (2013.01)
*G06F 21/62* (2013.01)

(52) U.S. Cl.
CPC ............ *G06F 21/53* (2013.01); *G06F 21/629* (2013.01); *G06F 2221/2143* (2013.01)

(56) References Cited

U.S. PATENT DOCUMENTS

| | | | |
|---|---|---|---|
| 2013/0160134 A1* | 6/2013 | Marcovecchio | H04L 63/1433 726/26 |
| 2014/0082056 A1 | 3/2014 | Gargiulo | |
| 2015/0096045 A1* | 4/2015 | Watson | G06Q 20/3229 726/26 |
| 2016/0027002 A1* | 1/2016 | Choi | G06Q 20/3229 705/41 |
| 2017/0034699 A1* | 2/2017 | Michel | H04W 12/069 |
| 2017/0357798 A1* | 12/2017 | Khan | G06Q 20/4014 |
| 2018/0054463 A1 | 2/2018 | Chang et al. | |

FOREIGN PATENT DOCUMENTS

| | | |
|---|---|---|
| CN | 104395909 A | 3/2015 |
| CN | 108780482 A | 11/2018 |
| EP | 2590383 B1 | 8/2017 |
| KR | 101448085 B1 | 10/2014 |

* cited by examiner

METHOD FOR DELETING SAFETY SERVICE AND ELECTRONIC DEVICE

CROSS-REFERENCE TO RELATED APPLICATIONS

This application is a U.S. National Stage of International Patent Application No. PCT/CN2019/117822 filed on Nov. 13, 2019, which claims priority to Chinese Patent Application No. 201811625740.9 filed on Dec. 28, 2018 and Chinese Patent Application No. 201811352889.4 filed on Nov. 14, 2018. All of the aforementioned applications are hereby incorporated by reference in their entireties.

TECHNICAL FIELD

This application relates to the field of communications technologies, and in particular, to a method for deleting a safety service, and an electronic device.

BACKGROUND

An electronic device has three-layer application environments, namely, a rich execution environment (Rich Execution Environment, REE), a trusted execution environment (Trusted Execution Environment, TEE), and a secure element (Secure Element, SE). A software system in an SE is simple and has relatively fewer hardware components, therefore it is easy to establish physical protection and guarantee security, and improve a security strength of the SE, so that a security system with a higher security requirement can be served.

Specifically, a secure domain (Secure Domain, SD) in the SE is mainly used to manage applets (applet) in the SE, and is responsible for providing security control functions such as security communication and identity authentication in a process of downloading or deleting an applet. The SD specifically includes an issuer secure domain (Issuer Secure Domain, ISD) (or referred to as a main secure domain) and a supplementary security domain (Supplementary Security Domain, SSD). The ISD is used by an SE issuer to manage all applets on the SE, including creating an SSD for an applet of a service party. The created SSD is specifically used to manage the applet of the service party.

For example, a user may install a bank APP on an electronic device by downloading an installation package from an application market. The user may process related bank services through the bank APP. The bank APP is provided with a function of installing a cell phone key. Then, the user may install the cell phone key by operating related options. To ensure data the security of the cell phone key, data having a high security requirement in the cell phone key is installed in an SE in the form of an applet by the electronic device. During the installation, the electronic device first applies for an SSD from a server of an SE issuer (manufacturer of the electronic device) through a server of a service party (bank), and installs an applet of the cell phone key in the SSD to manage the data having a high security requirement in the cell phone key.

When the user does not need to use a safety service any longer, an APP providing the safety service usually is directly deleted. In this case, the electronic device only deletes the APP of the safety service at the application layer, without deleting the applet or the SSD in the SE. In this case, for some safety services (such as a smart key or an access card), the applet in the SE may still directly interact with an external card reader through a near field communication (near field communication, NFC), and can implement corresponding functions without being invoked by the REE or the TEE, resulting in security risks.

SUMMARY

This application provides a method for deleting a safety service and an electronic device. The electronic device is capable of deleting a secure element applet (applet) correspond to a safety service in an SE, thereby preventing potential security risks caused by the secure element applet remaining in the SE, and enhancing the security of the electronic device.

According to a first aspect, this application provides a method for deleting a safety service, where the method is applicable to an electronic device, the electronic device has a secure element (SE), and the method includes:

receiving, by the electronic device, an instruction to erase data or restore factory settings, and configuring a first identifier according to the instruction; powering down or restarting the electronic device; reading, by the electronic device, the first identifier, if it is detected that the electronic device is powered on or connected to the Internet; sending, by the electronic device, a first request to a server, if the first identifier is configured, the first request being used to request the server to delete a safety service in the SE; receiving, by the electronic device, a first command sent by the server, the first command being a command sent by the server to instruct, according to the first request, the electronic device to delete a target safety service in the SE, and the target safety service being determined by the server according to safety services installed in the SE and a list of deletable safety services stored in the server; and deleting, by the electronic device, a secure element applet corresponding to the target safety service in the SE according to the first command.

For example, after receiving an operation (an operation of selecting an option of restoring factory settings in a system setting, or an operation of simultaneously pressing and holding a power button and a volume up button (or a volume down button)) performed by a user to restore factory settings, the electronic device may write into an operation identifier. The operation identifier is used to prompt the electronic device to restart and enter a recovery mode, and instruct the electronic device to restore factory settings or erase data.

For example, a list of deletable safety services is negotiated in advance by an SE issuer and a safety service party. When the electronic device erases data or restores factory settings, a TSM of the SE issuer may delete an applet and an SSD corresponding to an safety service in the SE.

It can be learned that when the electronic device erases data or restores factory settings, the electronic device may request a server to delete the applet corresponding to the safety service in the SE, thereby preventing potential security risks caused by the applet of the safety service (such as a smart key or an access card) remaining in the SE, and enhancing the security of the electronic device.

In a possible implementation manner, the method further includes: deleting, by the electronic device, a supplementary security domain (SSD) corresponding to the target safety service in the SE according to the first command.

Further, when erasing data or restoring factory settings, the electronic device may delete an SSD corresponding to the safety service according to a command from the server, helping to reclaim SE space, and improving space utilization of the SE.

In a possible implementation manner, the first identifier is stored in a trusted execution environment (TEE) of the electronic device or is stored in the SE. In this way, when the electronic device erases data or restores factory settings, the first identifier is not erased, so that after the electronic device erases data or restores factory settings, the safety service can be deleted according to the first identifier.

In a possible implementation manner, the first identifier is stored in a first area in the TEE of the electronic device, and the first area is an area that is not to be deleted after the electronic device erases data or restores factory settings.

In a possible implementation manner, the method further includes: prohibiting, by the electronic device, a near field communication (NFC) function of the secure element applet in the electronic device, if the electronic device receives the instruction to erase data or restore factory settings.

According to the method provided in the embodiments of this application, an SSD and an applet of a safety service are deleted according to a to-be-deleted identifier after a cell phone is powered on or connected to the Internet. Therefore, before the electronic device deletes the SSD and the applet of the safety service, applets of some safety services (such as a car key, an access card, and a bus card) may still directly interact with an external card reader through an NFC to implement corresponding functions, resulting in security risks. Therefore, after the electronic device receives the instruction to erase data or restore factory settings, the near field communication (NFC) function of the secure element applet in the electronic device is prohibited, helping to enhance the security of the electronic device.

In a possible implementation manner, the method further includes: configuring, by the electronic device, a second identifier, if the electronic device receives the instruction to erase data or restore factory settings, and denying, by a TEE application (TA) that is in the TEE of the electronic device and that manages the SE, access of a service TA to the SE in a case that the second identifier is configured.

Before the electronic device deletes the SSD and the applet of the safety service, applets of some safety services (such as an applet of a cell phone key) may still be possibly invoked by the TEE, resulting in security risks. Therefore, after the electronic device receives the instruction to erase data or restore factory settings, the TEE application (TA) that is in the TEE of the electronic device and that manages the SE denies access of a service TA to the SE, helping to enhance the security of the electronic device.

In a possible implementation manner, the second identifier is stored in a second area in the TEE of the electronic device, and the second area is an area that is not to be deleted after the electronic device erases data or restores factory settings.

In a possible implementation manner, after the electronic device deletes the secure element applet or the SSD corresponding to the target safety service in the SE according to the first command, the method for deleting a safety service further includes: erasing, by the electronic device, the second identifier.

The second identifier is an identifier for prohibiting the TEE from accessing the SE. After the electronic device deletes the safety service, a permission of the TEE to access to the SE may be recovered, thereby ensuring normal use of the electronic device.

In a possible implementation manner, the method further includes: reporting, by the electronic device, the SSD corresponding to the safety services installed in the SE and the secure element applet installed in the SSD corresponding to the installed safety services to the server.

A TSM of the SE is responsible for creating an SSD for a safety service in the SE, and a TSM of service specifically installs an applet of the safety service in the SSD. Therefore, the TSM of the SE is not aware of the installation of the applet in the SSD. According to a basic global platform (Global Platform, GP) of the SE, when deleting the SSD of the safety service, the TSM of the SE needs to delete the applet in the SSD first. Therefore, the TSM of the SE needs to synchronize data with the SE to obtain applet information in each SSD in the SE, so that the applet and the SSD can be deleted.

In a possible implementation manner, after the electronic device deletes the secure element applet or the SSD corresponding to the target safety service according to the first command, the method for deleting a safety service further includes: erasing, by the electronic device, the first identifier.

After the electronic device deletes the safety service, the first identifier is erased, thereby preventing the electronic device from performing a safety service deletion process again when the electronic device is powered on or connected to the Internet.

According to a second aspect, an electronic device is provided, including: a processor, a memory, and a touchscreen, where the memory and the touchscreen are coupled to the processor, the memory is configured to store a computer program code, the computer program code includes computer instructions, and the processor, when reading the computer instructions from the memory, causes the electronic device to perform the following operations:
  receiving an instruction to erase data or restore factory settings, and configuring a first identifier according to the instruction; powering down or restarting; reading the first identifier if it is detected that the electronic device is powered on or connected to the Internet; sending a first request to a server, if the first identifier is configured, the first request being used to request the server to delete a safety service in an SE; receiving a first command sent by the server, the first command being a command sent by the server to instruct, according to the first request, the electronic device to delete a target safety service in the SE, and the target safety service being determined by the server according to safety services installed in the SE and a list of deletable safety services stored in the server; and deleting a secure element applet corresponding to the target safety service in the SE according to the first command.

In a possible implementation manner, the method further includes: deleting a supplementary security domain (SSD) corresponding to the target safety service in the SE according to the first command.

In a possible implementation manner, the first identifier is stored in a trusted execution environment (TEE) of the electronic device or is stored in the SE.

In a possible implementation manner, the first identifier is stored in a first area in the TEE of the electronic device, and the first area is an area that is not to be deleted after the electronic device erases data or restores factory settings.

In a possible implementation manner, the method further includes:
  prohibiting a near field communication (NFC) function of the secure element applet in the electronic device, if the electronic device receives the instruction to erase data or restore factory settings.

In a possible implementation manner, the method further includes: configuring a second identifier, if the electronic device receives the instruction to erase data or restore factory settings, and denying, by a TEE application (TA) that is in the TEE of the electronic device and that manages the SE, access of a service TA to the SE in a case that the second identifier is configured.

In a possible implementation manner, the second identifier is stored in a second area in the TEE of the electronic device, and the second area is an area that is not to be deleted after the electronic device erases data or restores factory settings.

In a possible implementation manner, after deleting the secure element applet or the SSD corresponding to the target safety service according to the first command, the electronic device erases the second identifier.

In a possible implementation manner, the SSD corresponding to the safety services installed in the SE and the secure element applet installed in the SSD corresponding to the installed safety services are reported to the server.

In a possible implementation manner, after deleting the secure element applet or the SSD corresponding to the target safety service according to the first command, the electronic device erases the first identifier.

According to a third aspect, a computer storage medium is provided, the computer storage medium including computer instructions, the computer instructions, when run on a terminal, causing the terminal to perform the method according to the first aspect or any one of possible implementation manners therein.

According to a fourth aspect, a computer program product is provided, where the computer program product, when run on a computer, causes the computer to perform the method according to the first aspect or any one of possible implementation manners therein.

DESCRIPTION OF EMBODIMENTS

Figure 1:
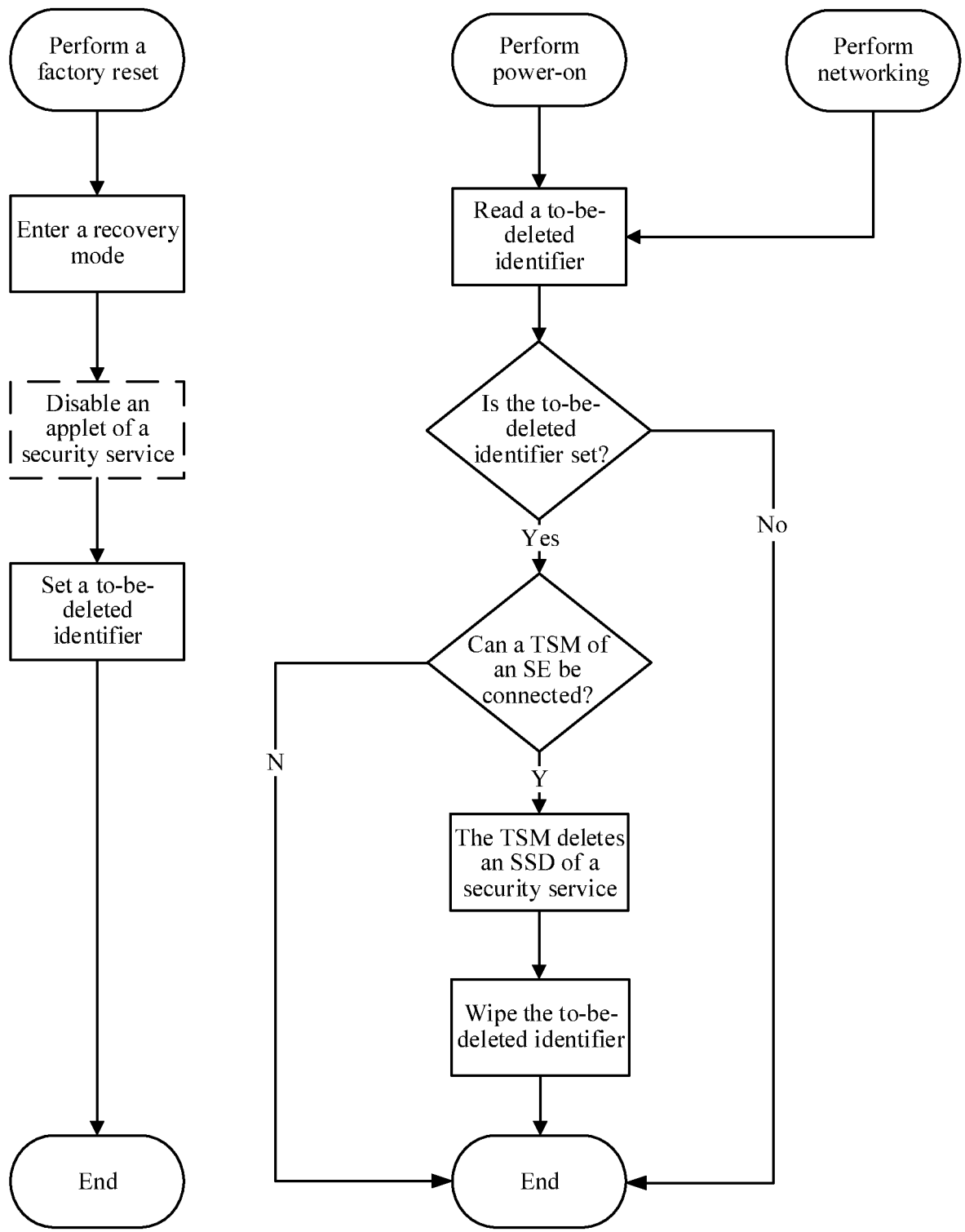
FIG. 1 is a schematic diagram of a method for deleting a safety service in an SE according to an embodiment of this application.

Generally, a service party deploys a safety service (such as a smart key, a cell phone key, a bank card, a bus card, or an access card) that has high security and is closely related to personal funds or identities, corresponding applications in three-layer application environments need to be deployed according to security levels of different data in the safety service. An application in an REE is referred to as a client application (client application, CA), and has a relatively low security requirement. An application in a TEE is a TEE application referred to as a TEE application (TEE application) and has a relatively high security requirement. An application in an SE is referred to as a secure element applet (applet), and has the highest security requirement among these three types of applications.

In these safety services, applets of some safety services (such as a cell phone key) need to be invoked by the REE and the TEE to implement corresponding functions. Applets of some safety services (for example, a smart key and an access card) may directly interact with an external card reader by using, for example, a near field communication (near field communication, NFC) technology, and can implement corresponding functions without being invoked by the REE and the TEE.

In the prior art, a user usually deletes these safety services by operating an APP on an electronic device. In one case, the electronic device directly deletes an APP of the safety service at an application layer, without deleting an applet or an SSD in the SE. This is because the applet of the safety service is installed and deleted by a TSM of the service party, and the electronic device cannot delete the applet of the safety service by itself. However, after the user deletes the APP of the safety service, the TSM of the service party has no incentive to delete the applet of the safety service in the SE, that is, the TSM does not actively delete the applet of the safety service in the SE. This is because if the applet of the safety service in the SE is not deleted, and the SSD in the applet is not deleted, when the electronic device installs the APP of the safety service again, the electronic device may no longer apply for the SSD from the TSM of an SE issuer. In this case, for some safety services (such as a smart key or an access card), the applet in the SE may still directly interact with an external card reader through an NFC, and can implement corresponding functions without being invoked by the REE or the TEE, resulting in security risks.

In another case, after the user deletes the App of the safety service, even if the TSM of the service party is motivated or willing to actively delete the applet of the safety service in the SE, there is a problem that the TSM of the service party cannot detect whether the user deletes the APP of the safety service, and therefore cannot delete the applet of the safety service in the SE, and cannot delete the SSD.

In another case, the TSM of the service party may detect that the user deletes the APP of the safety service. For example, after the user operates an APP on an electronic device, the APP on the electronic device may interact with a trusted service management (Trusted Service Management, TSM) of a service party, and the TSM of the service party performs an over the air technology (Over the Air Technology, OTA) to delete the safety service applet from the SE. However, the SSD corresponding to the safety service is created and deleted by the issuer (usually the TSM of the SE issuer. hereinafter referred to as the TSM of the SE) of the SE. Therefore, the TSM of the service party still cannot delete the SSD of the safety service by itself.

Based on the above, even after the TSM of the service party deletes the applet of the safety service, the SSD of the safety service cannot be deleted. As a result, unused SSDs remain in the SE, and SE space is wasted.

Currently, based on the foregoing reasons, when the electronic device restores factory settings, applications of the electronic device in the REE and the TEE are deleted, but applets and SSDs in the SE are not deleted. Therefore, according to the method provided in this embodiment of this application, when the electronic device restores factory settings, an applet and an SSD of an erased safety service are deleted, thereby helping reclaim SE space, and improving space utilization of the SE.

In this embodiment of this application, the TSM of the SE and the TSM of the service party may negotiate in advance whether the TSM of the SE can delete the applet and the SSD in the SE when the electronic device restores factory settings. For an applet and an SSD that are allowed to be deleted by the service party, when the electronic device restores factory settings, the applet and the SSD in the SE of the electronic device are also deleted.

FIG. 1 is a schematic diagram of a method for deleting a safety service according to an embodiment of this application. Specifically, when an electronic device enters a recovery mode, and the electronic device instructs to restore factory settings or erase data, a to-be-deleted identifier is configured. Then, when it is detected that the electronic device is powered on or connected to the Internet, the to-be-deleted identifier is read. If the to-be-deleted identifier is configured, a TSM of an SE is notified. The TSM of the SE deletes an applet and an SSD of the safety service in the SE.

The recovery is a backup function of the electronic device, and may modify data inside the electronic device or a system of the electronic device. In this mode, the electronic device may erase data or restore factory settings (wipe data/factory reset). In this mode, the electronic device may further back up or upgrade an existing system, for example, back up and restore (backup and restore) a system, install an update.zip (apply SDcard: update.zip) in a memory card, and install a zip (install zip from SDcard) from an SDcard. The method for setting a to-be-deleted identifier provided in this embodiment of this application is performed in a process of erasing data or restoring factory settings by the electronic device. Because the process of erasing data or restoring factory settings by the electronic device is performed in a recovery mode, operations that can be performed by the electronic device are limited, thereby helping ensure the security of the electronic device.

In some embodiments of this application, when the electronic device enters the recovery mode, an application of the safety service may be further prohibited. Then, the electronic device is powered on or connected to the Internet. Before the electronic device deletes the applet and the SSD of the safety service, it can be ensured that the applet of the safety service is not invoked, thereby ensuring the security of the electronic device.

After deleting the SSD of the safety service in the SE, the electronic device erases the to-be-deleted identifier. In this way, a case that the deletion process is repeatedly performed when the electronic device is powered on or connected to the Internet again after deleting the SSD of the safety service can be avoided.

For example, the electronic device in this application may be a mobile phone, a tablet computer, a personal computer (Personal Computer, PC), a personal digital assistant (personal digital assistant, PDA), a smartwatch, a netbook, a wearable electronic device, or an augmented reality technology (Augmented Reality, AR) device, a virtual reality (Virtual Reality, VR) device, an in-vehicle device, a smart car, a smart sound, a robot, or the like. A specific form of the electronic device is not specially limited in this application.

Figure 2A:
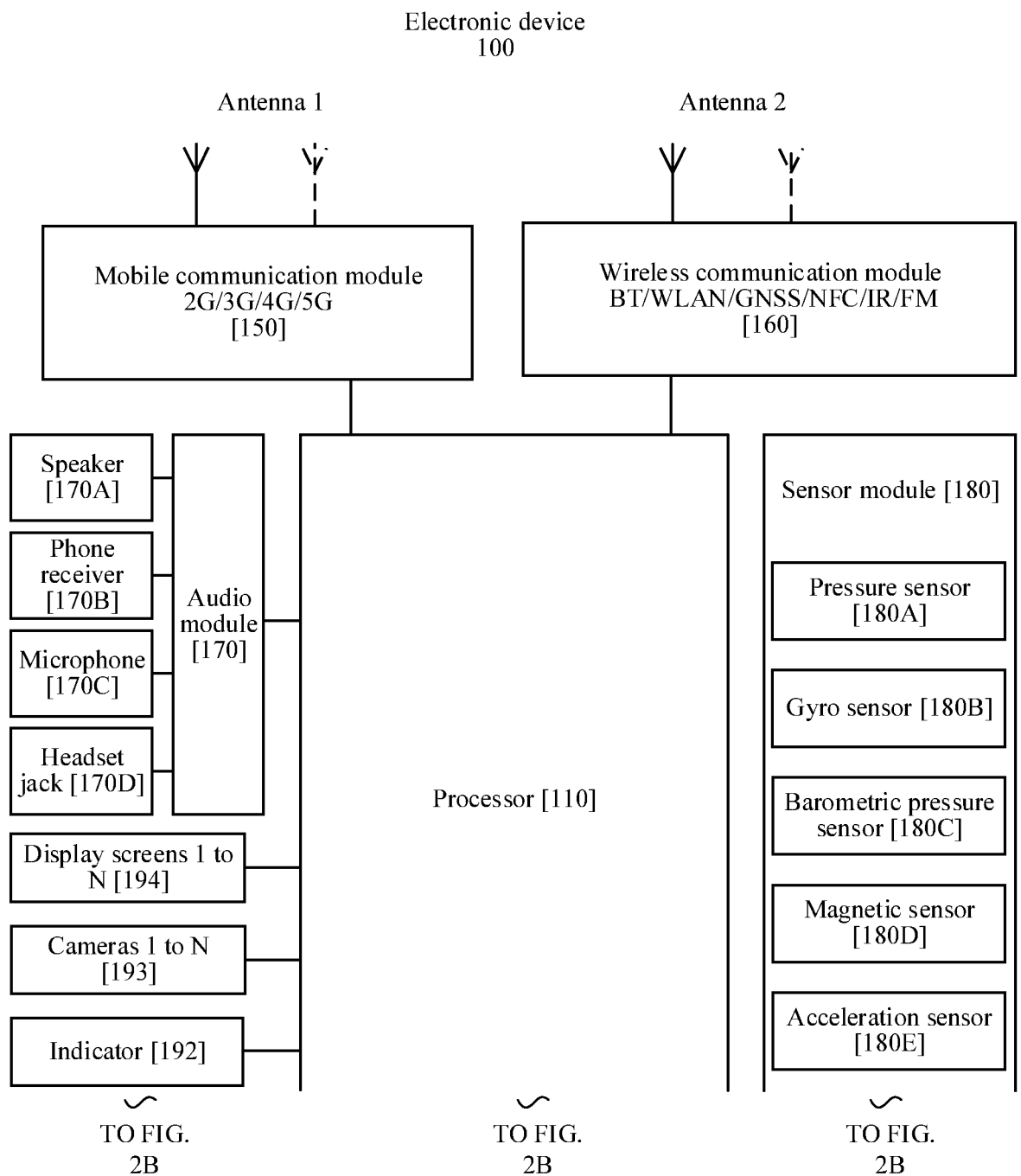
FIG. 2A and FIG. 2B are a schematic structural diagram of an electronic device according to an embodiment of this application.
Figure 2B:
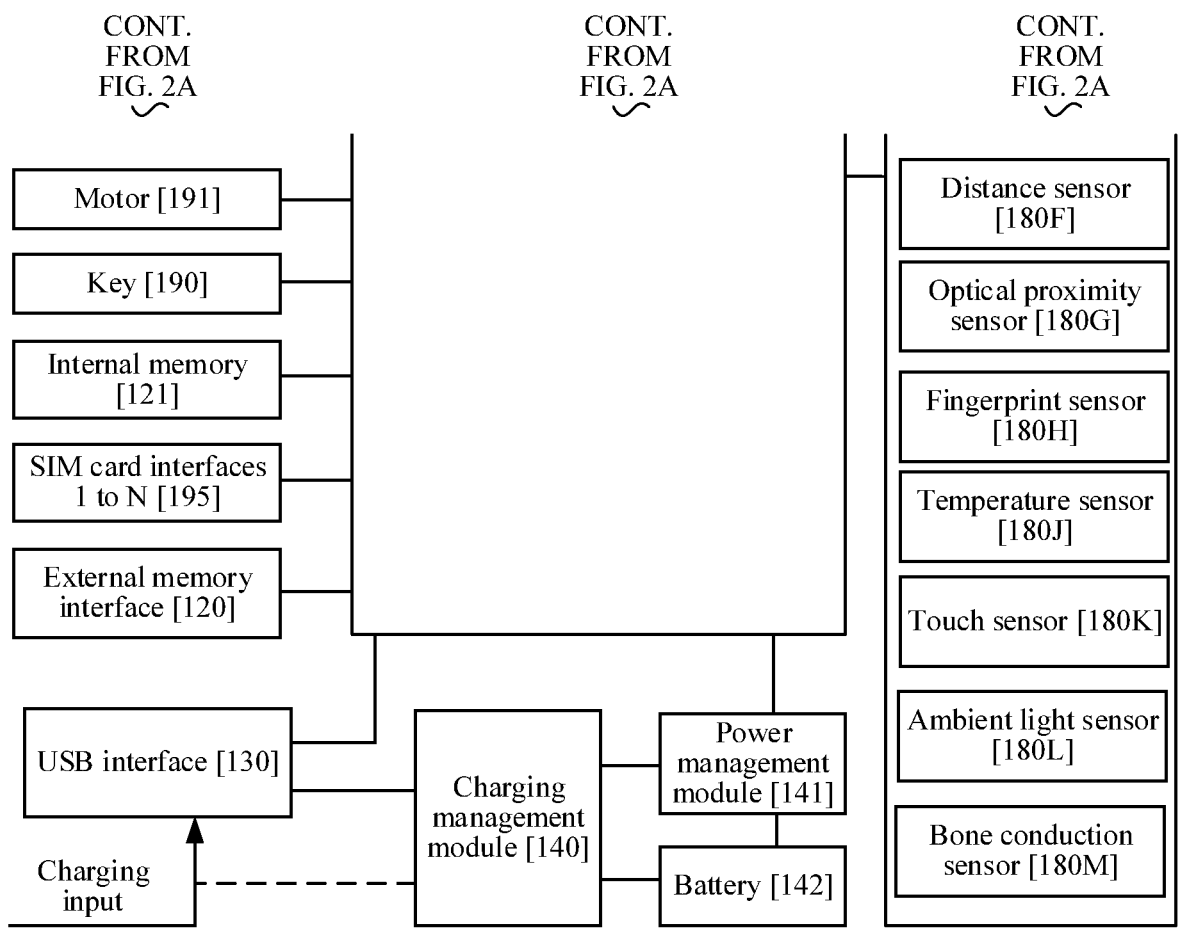

FIG. 2 is a schematic structural diagram of a electronic device 100.

The electronic device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, and an audio module 170, a speaker 170A, a receiver 170B, a microphone 170C, a headset jack 170D, a sensor module 180, a push-button 190, a motor 191, an indicator 192, a camera 193, a display screen 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that a structure shown in this embodiment of the present invention does not constitute a specific limitation on the electronic device 100. In some other embodiments of this application, the electronic device 100 may include more or fewer components than those shown in the figure, or some components may be combined, or some components may be split, or a different component deployment may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent components, or may be integrated into one or more processors.

The controller may be a nerve center and a command center of the electronic device 100. The controller may generate an operation control signal according to an instruction operation code and a time sequence signal, to complete control of obtaining and executing an instruction.

A memory may be further disposed in the processor 110, and is configured to store instructions and data. In some embodiments, the memory in the processor 110 is a cache. The memory may store an instruction or data that has just been used or cyclically used by the processor 110. If the processor 110 needs to use the instruction or the data again, the processor 110 may directly invoke the instruction or the data from the memory. Repeated storage is avoided, and a waiting time of the processor 110 is reduced, thereby improving system efficiency.

In some examples of this application, the processor 110 includes three hardware independent units. The three hardware independent units specifically are a baseband processing unit, an application processing unit, and a security unit. The baseband processing unit may be, for example, a baseband processor (Baseband Processor, BP), the application processing unit may be, for example, an application processor (Application Processor), and the security unit may be, for example, a secure element (Secure Element, SE). The SE may install an SSD or the like for a safety service in the SE according to an instruction of a TSM (a server of an electronic device manufacturer) of an SE issuer. The SE may further install an applet of the safety service in the SSD according to an instruction of a TSM (a server of a service party) of a safety service party.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

The I2C interface is a two-way synchronization serial bus, including a serial data line (serial data line, SDA) and a serial clock line (derail clock line, SCL). In some embodiments, the processor 110 may include a plurality of groups of I2C buses. The processor 110 may separately be couple<Bold></Bold> to the touch sensor 180K, a charger, a flash, the camera 193, and the like by using different I2C bus interfaces. For example, the processor 110 may be coupled to the touch sensor 180K by using an I2C interface, so that the processor 110 communicates with the touch sensor 180K by using an I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using an I2S interface, to implement a function of answering a call by using a Bluetooth headset.

The PCM interface may alternatively be used for audio communication to sample, quantize, and encode analog signals. In some embodiments, the audio module 170 and the wireless communication module 160 may be coupled by using a PCM bus interface. In some embodiments, the audio module 170 may alternatively transfer an audio signal to the wireless communication module 160 through a PCM interface, to implement a function of answering a call by using a Bluetooth headset. Both the I2S interface and the PCM interface may be used for audio communication.

The UART interface is a universal serial data bus used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement a function of playing music by using a Bluetooth headset.

The MIPI interface may be configured to connect the processor 110 to a peripheral device such as the display screen 194 and the camera 193. The MIPI interface includes a camera serial interface (camera serial interface, CSI), a display serial interface (display serial interface, DSI), and the like. In some embodiments, the processor 110 and the camera 193 communicate by using a CSI interface, to implement a photographing function of the electronic device 100. The processor 110 and the display screen 194 communicate by using a DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, and the like. The GPIO interface may alternatively be configured as an I2C interface, an I2S interface, a UART interface, a MIPI interface, or the like.

The USB interface 130 is an interface conforming to a USB standard specification, and may be specifically a Mini USB interface, a Micro USB interface, a USB Type C interface, or the like. The USB interface 130 may be configured to connect to a charger to charge the electronic device 100, or may be configured to transmit data between the electronic device 100 and a peripheral device. The USB interface 130 may further be connected to a headset to play audio through the headset. The interface may further be configured to connect to another electronic device, for example, an AR device.

It may be understood that an interface connection relationship between modules shown in this embodiment of the present invention is merely an example for description, and does not constitute a limitation on a structure of the electronic device 100. In some other embodiments of this application, the electronic device 100 may alternatively use the different interface connection manners or a combination of a plurality of the interface connection manners in the foregoing embodiments.

The charging management module 140 is configured to receive a charging input from a charger. The charger may be a wireless charger or a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the electronic device 100. When charging the battery 142, the charging management module 140 may further supply power to the electronic device by using the power management unit 141.

The power management unit 141 is configured to connect the battery 142 and the charging management module 140 to the processor 110. The power management unit 141 receives inputs from the battery 142 and/or the charging management module 140, and supplies power to the processor 110, the internal memory 121, the external memory, the display screen 194, the camera 193, the wireless communication module 160, and the like. The power management unit 141 may be further configured to monitor parameters such as a battery capacity, a quantity of battery cycles, and a battery health status (electric leakage and impedance). In some other embodiments, the power management unit 141 may further be disposed in the processor 110. In some other embodiments, the power management unit 141 and the charging management module 140 may further be disposed in a same device.

The wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover a single or more communication frequency bands. Different antennas may further be reused to improve antenna utilization. For example, the antenna 1 may be reused as a diversity antenna of a wireless local area network. In other embodiments, the antenna may be used in combination with a tuning switch.

The mobile communication module 150 may provide a wireless communication solution that includes 2G/3G/4G/5G and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, process, for example, filter and amplify, the received electromagnetic wave, and transmit the received electromagnetic wave to a modem processor for demodulation. The mobile communication module 150 may further amplify a signal modulated by the modem processor, and convert the signal into an electromagnetic wave by using the antenna 1 and radiate the electromagnetic wave. In some embodiments, at least some function modules of the mobile communication module 150 may be disposed in the processor 110. In some embodiments, at least some function modules of the mobile communication module 150 and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is transmitted to the application processor after being processed by the baseband processor. The application processor outputs a sound signal by using an audio device (not limited to the speaker 170A, the receiver 170B, or the like), or displays an image or a video by using the display screen 194. In some embodiments, the modem processor may be an independent device. In some other embodiments, the modem processor may be independent of the processor 110, and may be disposed in a same device together with the mobile communication module 150 or another function module.

The wireless communication module 160 may provide a wireless communication solution applied to the electronic device 100, including wireless local area networks (wireless local area networks, WLAN) (for example, a wireless fidelity (wireless fidelity, Wi-Fi) network), Bluetooth (bluetooth, BT), and a global navigation satellite system (global navigation satellite system, GNSS), frequency modulation (frequency modulation, FM), near field communication (near field communication, NFC), and infrared (infrared, IR). The wireless communication module 160 may be one or more devices that integrate at least one communication processing module. The wireless communication module 160 receives an electromagnetic wave through the antenna 2, performs frequency modulation and filtering on the electromagnetic wave signal, and sends the processed signal to the processor 110. The wireless communication module 160 may alternatively receive a to-be-sent signal from the processor 110, perform frequency modulation and amplification on the to-be-sent signal, and convert the signal into an electromagnetic wave through the antenna 2 to radiate the signal.

In some embodiments, the antenna 1 of the electronic device 100 is coupled to the mobile communication module 150, and the antenna 2 is coupled to the wireless communication module 160. In this way, the electronic device 100 may communicate with a network and another device by using a wireless communication technology. The wireless communication technology may include a Global System for mobile communications (Global System for Mobile Communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), and a beidou navigation satellite system (beidou navigation satellite system, BDS), a quasi-zenith satellite system (quasi-zenith satellite system, QZSS) and/or satellite based augmentation systems (satellite based augmentation systems, SBAS).

The electronic device 100 implements a display function by using a GPU, the display screen 194, the application processor, and the like. The GPU is a microprocessor for image processing, and is connected to the display screen 194 and the application processor. The GPU is used to perform mathematical and geometric calculations and to render graphics. The processor 110 may include one or more GPUs that execute program instructions to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), miniLED, microLED, a micro-OLED, quantum dot light emitting diodes (quantum dot light emitting diodes, QLED), and the like. In some embodiments, the electronic device 100 may include one or N display screens 194. N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is enabled, light is transferred to a camera light sensitive element by using a lens, the optical signal is converted into an electrical signal, and the camera light sensitive element transfers the electrical signal to the ISP for processing, and converts the electrical signal into an image visible to the naked eye. The ISP may further perform algorithm optimization on image noise, brightness, and skin color, and optimize parameters such as exposure and color temperature of a shooting scene. In some embodiments, the ISP may be disposed in the camera 193.

The camera 193 is configured to capture a still image or a video. An optical image of an object is generated by using the lens and is projected to the light sensitive element. The light sensitive element may be a charge coupled device (charge coupled device, CCD) or a complementary metal-oxide-semiconductor (complementary metal-oxide-semiconductor, CMOS) phototransistor. The light sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in the format of standard RGB, YUV or the like. In some embodiments, the electronic device 100 may include one or N cameras 193. N is a positive integer greater than 1.

The digital signal processor is configured to process a digital signal, and may process other digital signals in addition to a digital image signal. For example, when the electronic device 100 performs frequency selection, the digital signal processor is configured to perform Fourier transform on frequency energy.

The video codec are configured to compress or decompress a digital video. The electronic device 100 may support one or more video encoders and video decoders. In this way, the electronic device 100 may play or record videos in multiple encoding formats, for example, moving picture experts group (moving picture experts group, MPEG) 1, MPEG 2, MPEG 3, and MPEG 4.

The NPU is a neural-network (neural-network, NN) computing processor. By referring to a structure of a biological neural network, for example, a transmission mode between neurons in a human brain, the NPU quickly processes input information, and may further continuously perform self-learning. Applications such as intelligent cognition of the electronic device 100, for example, image recognition, facial recognition, speech recognition, and text understanding, may be implemented by using the NPU.

The external memory interface 120 may be configured to connect to an external storage card, for example, a micro SD card, to extend a storage capability of the electronic device 100. The external storage card communicates with the processor 110 by using the external memory interface 120, to implement a data storage function. For example, files such as music and videos are stored in the external storage card.

The internal memory 121 may be configured to store computer executable program code, where the executable program code includes an instruction. The processor 110 executes various function applications and data processing of the electronic device 100 by running the instruction stored in the internal memory 121. The internal memory 121 may include a program storage area and a data storage area. The program storage area may store an operating system, an application program required by at least one function (for example, a sound playback function and an image display function), and the like. The data storage area may store data (for example, audio data and phone book) created during the use of the electronic device 100, and the like. In addition, the internal memory 121 may include a high speed random access memory, and may further include a non-volatile memory, for example, at least one magnetic disk storage device, a flash memory device, or a universal flash storage (universal flash storage, UFS).

The electronic device 100 may implement an audio function by using the audio module 170, the speaker 170A, the receiver 170B, the microphone 170C, the headset jark 170D, the application processor, and the like, for example, music playing or recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110. Alternatively, some function modules of the audio module 170 may be disposed in the processor 110.

The loudspeaker 170A is configured to convert an audio electrical signal into a sound signal. The electronic device 100 may listen to music or listen to a hands-free call by using the speaker 170A.

The receiver 170B, also referred to as an "earpiece", is configured to convert an audio electrical signal into a sound signal. When answering a call or a piece of voice information through the electronic device 100, the voice may be answered by holding the receiver 170B close to a human ear.

The microphone 170C is configured to convert a sound signal into an electrical signal. When making a call or sending a piece of voice information, a user may make a sound by holding the microphone 170C close to the mouth, and input a sound signal to the microphone 170C. At least one microphone 170C may be disposed in the electronic device 100. In some other embodiments, the electronic device 100 may be provided with two microphones 170C, to collect a sound signal, and further implement a noise reduction function. In some other embodiments, the electronic device 100 may further be provided with three, four, or more microphones 170C, to implement sound signal collection and noise reduction, and further identify a sound source, implement a directional recording function, and the like.

The headset jark 170D is configured to connect to wired headsets. The headset jark 170D may be a USB interface 130, or may be an open mobile terminal platform (open mobile terminal platform, OMTP) standard interface of 3.5 mm, or a cellular telecommunications industry association of the USA (cellular telecommunications industry association of the USA, CTIA) standard interface. The pressure sensor 180A is configured to sense a pressure signal and may convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may include at least two parallel plates having a conductive material. When force acts on the pressure sensor 180A, the capacitance between electrodes changes. The electronic device 100 determines the strength of the pressure according to the change of the capacitance. When a touch operation acts on the display screen 194, the electronic device 100 detects intensity of the touch operation by using the pressure sensor 180A. The electronic device 100 may also calculate a touch position according to a detection signal of the pressure sensor 180A. In some embodiments, touch operations performed at the same touch position but with different touch operation intensity may correspond to different operation instructions. For example, when a touch operation whose touch operation intensity is less than a first pressure threshold acts on a short message application icon, an instruction for viewing the short message is executed. When a touch operation whose touch operation intensity is greater than or equal to the first pressure threshold acts on the short message application icon, an instruction for creating a new short message is executed.

The gyro sensor 180B may be configured to determine a motion posture of the electronic device 100. In some embodiments, angular velocities of the electronic device 100 around three axes (that is, x, y, and z axes) may be determined by using the gyro sensor 180B. The gyro sensor 180B may be used for image stabilization in photography. For example, when a shutter is pressed, the gyro sensor 180B detects a jitter angle of the electronic device 100, and calculates, according to the angle, a distance that needs to be compensated by a lens module, so that the lens cancels jitter of the electronic device 100 through reverse motion, thereby implementing anti-jitter. The gyro sensor 180B may be further used in a navigation and a motion sensing game scenario.

The barometric pressure sensor 180C is configured to measure barometric pressure. In some embodiments, the electronic device 100 calculates an altitude according to a barometric pressure value measured by the barometric pressure sensor 180C, to assist positioning and navigation. The magnetic sensor 180D includes a Hall effect sensor. The electronic device 100 may detect opening and closing of a flip carrying case by using the magnetic sensor 180D. In some embodiments, when the electronic device 100 is a flip machine, the electronic device 100 may detect opening and closing of the flip by using the magnetic sensor 180D. Then, features such as automatic unlocking of the flip are set according to the detected open-closing state of the carrying case or the detected open-closing state of the flip.

The acceleration sensor 180E may detect acceleration values of the electronic device 100 in various directions (generally three axes). When the electronic device 100 is static, a magnitude and a direction of gravity may be detected. The acceleration sensor 180E may be further used to identify an electronic device posture, and is applied to applications such as landscape/portrait switching and a pedometer.

The distance sensor 180F is configured to measure a distance. The electronic device 100 may measure a distance through an infrared or a laser. In some embodiments, in a shooting scenario, the electronic device 100 may perform ranging by using the distance sensor 180F to implement fast focusing.

The optical proximity sensor 180G may include, for example, a light emitting diode (LED) and a light detector, such as a photodiode. The light emitting diode may be an infrared emitting diode. The electronic device 100 emits infrared light outward by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, so as to automatically turn off a screen to achieve power saving. The optical proximity sensor 180G may alternatively be used in a carrying case mode and pocket mode to automatically unlock or lock the screen.

The ambient optical sensor 180L is configured to sense luminance of ambient light. The electronic device 100 may adaptively adjust luminance of the display screen 194 based on perceived luminance of ambient light. The ambient optical sensor 180L may alternatively be used to automatically adjust white balance during photographing. The ambient optical sensor 180L may further cooperate with the optical proximity sensor 180G to detect whether the electronic device 100 is in a pocket, to prevent accidental touch.

The fingerprint sensor 180H is configured to collect a fingerprint. The electronic device 100 may implement fingerprint unlock, access an application lock, perform fingerprint photography, answer a call through fingerprint, and the like by using the feature of a collected fingerprint.

The temperature sensor 180J is configured to detect temperature. In some embodiments, the electronic device 100 executes a temperature processing policy by using temperature detected by the temperature sensor 180J. For example, when the temperature reported by the temperature sensor 180J exceeds a threshold, the electronic device 100 reduces performance of a processor located near the temperature sensor 180J, so that power consumption can be reduced and thermal protection can be implemented. In some other embodiments, when the temperature is lower than another threshold, the electronic device 100 heats the battery 142, to avoid abnormal power-off of the electronic device 100 caused by low temperature. In some other embodiments, when the temperature is lower than another threshold, the electronic device 100 boosts the output voltage of the battery 142, to avoid abnormal power-off caused by low temperature.

The touch sensor 180K is also referred to as a "touch panel". The touch sensor 180K may be disposed on the display screen 194, and the touch sensor 180K and the display screen 194 form a touchscreen. The touch sensor 180K is configured to detect a touch operation acting on or near the touch sensor 180K. The touch sensor may transfer a detected touch operation to the application processor, to determine a type of a touch event. Visual output related to the touch operation may be provided by using the display screen 194. In some other embodiments, the touch sensor 180K may alternatively be disposed on a surface of the electronic device 100, and a location thereof is different from that of the display screen 194.

The bone conduction sensor 180M may obtain a vibration signal. In some embodiments, the bone conduction sensor 180M may obtain a vibration signal of a vibration bone block in a human sound part. The bone conduction sensor 180M may further contact a human pulse to receive a blood pressure pulse signal. In some embodiments, the bone conduction sensor 180M may further be disposed in a headset, and is combined with the headset to become a bone conduction headset. The audio module 170 may parse out a voice signal based on the vibration signal of a vibration bone block in a human sound part obtained by the bone conduction sensor 180M, to implement a voice function. The application processor may parse heart rate information based on the blood pressure pulse signal obtained by the bone conduction sensor 180M, to implement a heart rate detection function.

The key 190 includes a power on key, a volume key, and the like. The key 190 may be a mechanical key or a touch-based key. The electronic device 100 may receive a key input, and generate key signal input related to a user setting and function control of the electronic device 100.

The motor 191 may generate a vibration prompt. The motor 191 may be used for an incoming call vibration prompting, or may be used for touch vibration feedback. For example, touch operations performed on different applications (for example, photographing or audio playing) may correspond to different vibration feedback effects. For touch operations performed on different areas of the display screen 194, the motor 191 may also correspond to different vibration feedback effects. Different application scenarios (for example, time reminders, information receiving, alarm clocks, and games) may also correspond to different vibration feedback effects. The touch vibration feedback effect may further be customized.

The indicator 192 may be an indicator light, and may be used to indicate a charging status and a power change, or may be used to indicate a message, a missed call, a notification, and the like. The SIM card interface 195 is configured to connect to a SIM card. The SIM card may be inserted into the SIM card interface 195 or removed from the SIM card interface 195, to contact or separate from the electronic device 100. The electronic device 100 may support one or N SIM card interfaces. N is a positive integer greater than 1. The SIM card interface 195 may support a nano SIM card, a micro SIM card, a SIM card, and the like. A plurality of cards may be inserted into the same SIM card interface 195 at the same time. Types of the plurality of cards may be the same or may be different. The SIM card interface 195 may further be compatible with different types of SIM cards. The SIM card interface 195 may further be compatible with an external memory card. The electronic device 100 interacts with a network by using a SIM card, to implement functions such as a call and data communication. In some embodiments, the electronic device 100 uses an eSIM, that is, an embedded SIM card. The eSIM card may be embedded in the electronic device 100, and cannot be separated from the electronic device 100.

The software system of the electronic device 100 may use a layered architecture, an event-driven architecture, a microkernel architecture, a microservice architecture, or a cloud architecture. In this embodiment of the present invention, an Android system with a layered architecture is used as an example to exemplarily describe a software structure of the electronic device 100.

Figure 3:
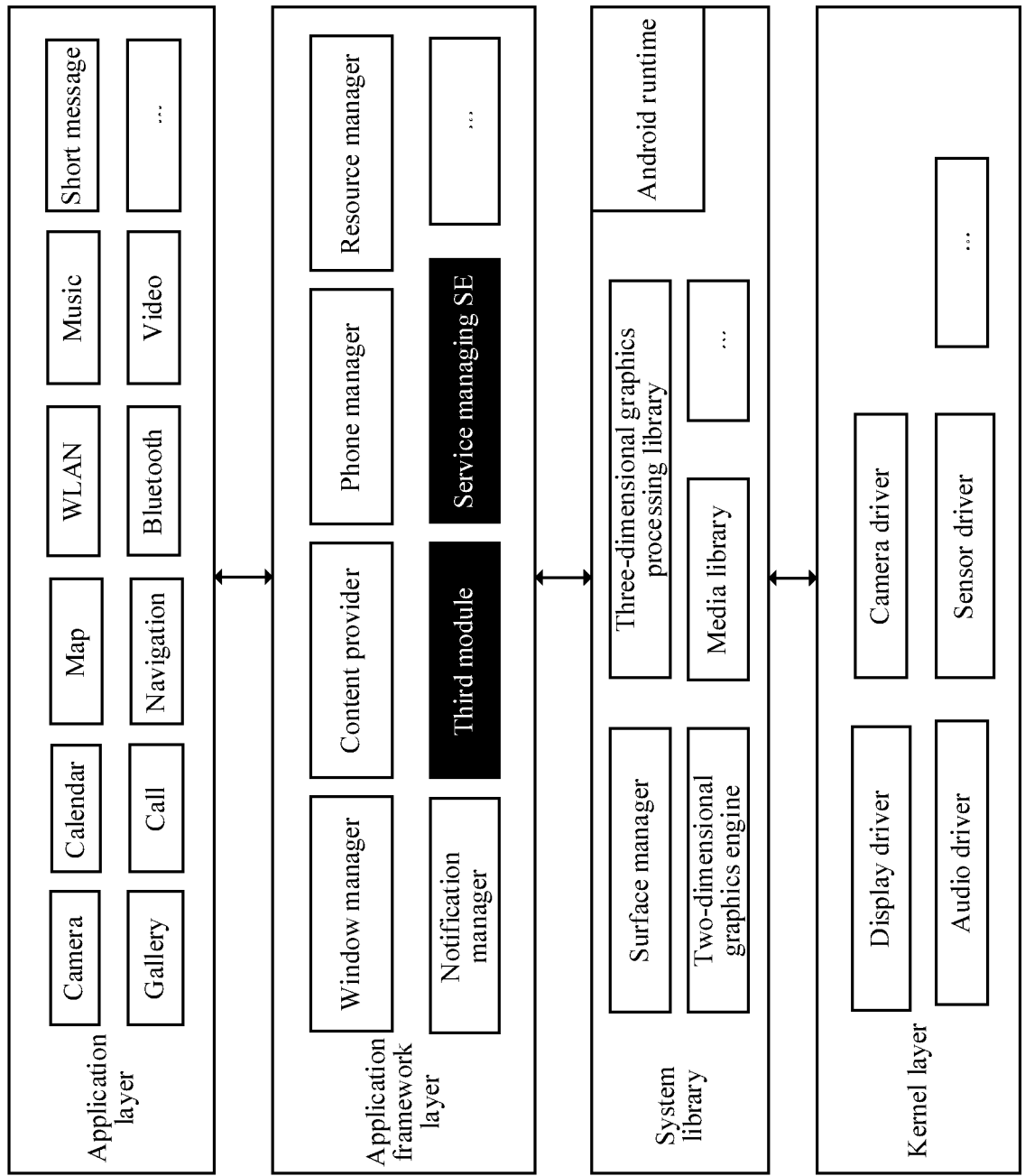
FIG. 3 is a schematic structural diagram of still another electronic device according to an embodiment of this application.

FIG. 3 is a software structural block diagram of an electronic device 100 according to an embodiment of the present invention.

A layered architecture divides software into several layers, each with clear roles and responsibilities. Layers communicate with each other through software interfaces. In some embodiments, the Android system is divided into four layers: an application layer, an application framework layer, an Android runtime (Android runtime), a system library, and a kernel layer from top to bottom. The application layer may include a series of application packages.

As shown in FIG. 3, the application layer may include application packages such as a camera, a gallery, a calendar, a call, a map, a navigation, a WLAN, Bluetooth, music, a video, and a short message.

The application framework layer provides an application programming interface (application programming interface, API) and a programming framework for an application at the application layer. The application framework layer includes some predefined functions.

As shown in FIG. 3, the application framework layer may include a window manager, a content providing device, a view system, a telephony manager, a Windows Explorer, a notification manager, and the like.

In some embodiments of this application, the application framework may include a service for managing an SE. The service for managing an SE may communicate with a cloud server, for example, a TSM of an SE issuer (hereinafter referred to as the TSM of the SE for short). For example, a command of sending an application protocol data unit (application protocol data unit, APDU) sent by the TSM of the SE to the SE is received, so that the SE executes a corresponding command. The service for managing the SE may also request, by using a CA managing the SE, a TA managing the SE to sign. For details about specific functions of the service for managing the SE, refer to the following description.

In some other embodiments of this application, the application framework layer may further include a third module. The third module may be configured to detect that the electronic device 100 is powered on or connected to the Internet, or the like. In some examples, the third module may further communicate with the TSM of the SE, to read a to-be-deleted identifier, request the TSM of the SE to perform data synchronization with the SE, send a command for restoring factory settings of the SE, and the like. In some other examples, the third module may further communicate with the service for managing the SE, to notify the service for managing the SE that the to-be-deleted identifier is configured.

The window manager is used to manage a window program. The window manager may obtain the size of a display screen, determine whether there is a status bar, lock a screen, capture a screen, and the like.

The content providing device is configured to store and obtain data and make the data accessible to applications. The data may include videos, images, audio, calls made and answered, browsing history and bookmarks, phone books, and the like.

The view system includes a visual control, such as a control for displaying texts and a control for displaying pictures. The view system may be used to build applications. The display interface may include one or more views. For example, a display interface of a short message notification icon may include a view for displaying texts and a view for displaying pictures.

The telephony manager is configured to provide a communication function of the electronic device 100, for example, call status management (including call connection and hangup).

The Windows Explorer provides various resources for applications, for example, localized character string, icons, pictures, layout files, and video files.

The notification manager enables an application to display a notification message in a status bar. The notification manager may be used to convey a notification message and disappear automatically after a short pause without user interaction. For example, the notification manager is used to notify that download is completed or is used for a message notification, and the like. The notification manager may alternatively be a notification that appears on a top status bar of a system in the form of a chart or scroll bar texts, for example, a notification from an application running in the background, or may be a notification that appears on a screen in the form of a dialog window. For example, text information is displayed in the status bar, a prompt tone is generated, the electronic device vibrates, or an indicator blinks.

The Android Runtime includes a kernel library and a virtual machine, and is responsible for scheduling and managing an Android system.

The kernel library includes two parts. One part is functional functions that needs to be invoked by Java language, and the other part is an Android kernel library.

The application layer and the application framework layer run in the virtual machine. The virtual machine executes java files at the application layer and the application framework layer as binary files. The virtual machine is used to manage an object life cycle, stacks, threads, security and exceptions, garbage collection, and the like.

The system library may include a plurality of function modules. For example, a surface manager (surface manager), media libraries (Media Libraries), a three-dimensional graphics processing library (for example, OpenGL ES), and a 2D graphics engine (for example, SGL).

The surface manager is configured to manage a display subsystem and provide a combination of 2D and 3D layers for multiple applications.

The media library supports playback and recording of audios and videos of common formats, as well as static image files. The media library may support multiple audio and video encoding formats, such as MPEG4, H.264, MP3, AAC, AMR, JPG, and PNG.

The 3D graphics processing library is used to implement 3D graphics drawing, image rendering, composition, and layer processing.

The 2D graphics engine is a graphics engine for 2D graphics.

The kernel layer is a layer between hardware and software. The kernel layer includes at least a display driver, a camera driver, an audio driver, and a sensor driver.

The following exemplarily describes, a working process of software and hardware of the electronic device 100 with reference to a capture photographing scenario.

When the touch sensor 180K receives a touch operation, a corresponding hardware interrupt is sent to the kernel layer. The kernel layer processes the touch operation into an original input event (including a touch coordinates and a time stamp of the touch operation). The original input event is stored at the kernel layer. The application framework layer obtains the original input event from the kernel layer, and identifies a control corresponding to the input event. For example, the touch operation is a touch click operation. A control corresponding to the click operation is a control of a camera application icon. The camera application invokes an interface of the application framework layer to start the camera application, and then invokes the kernel layer to start a camera driver, and captures a static image or a video by using the camera 193.

All technical solutions in the following embodiments may be implemented in the electronic device 100 having the foregoing hardware architecture and software architecture.

Figure 4:
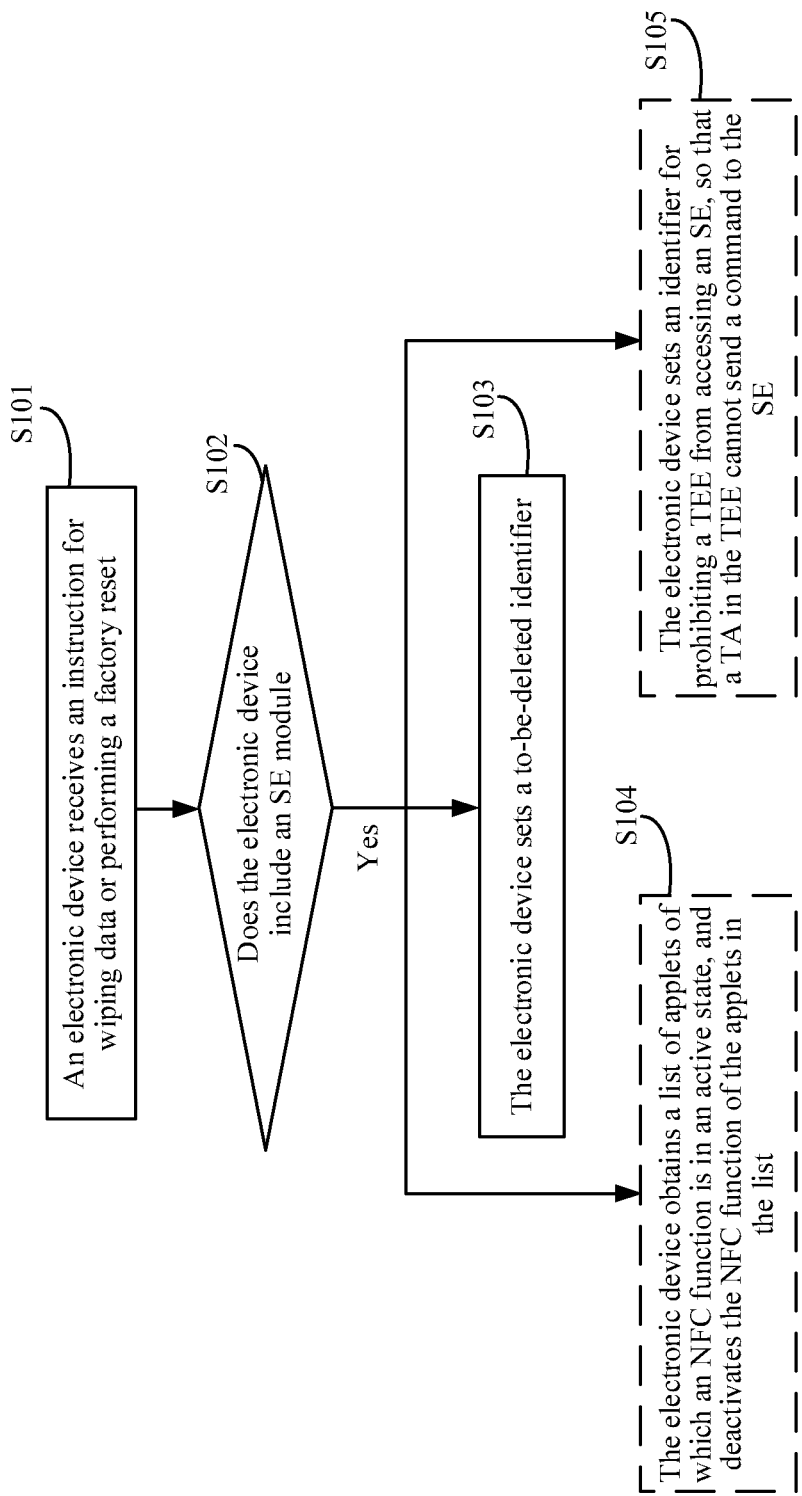
FIG. 4 is a schematic diagram of a method for setting a to-be-deleted identifier according to an embodiment of this application.

FIG. 4 is a schematic flowchart of a method for setting a to-be-deleted identifier for a safety service according to an embodiment of this application. The method specifically includes the following steps.

S101. An electronic device receives an instruction to erase data or restore factory settings. Generally, when receiving the instruction to erase data or restore factory settings, the electronic device enters a recovery mode. For example, when the electronic device is in a powered-on state, a user may operate an option of restoring factory settings in a system setting of the electronic device, so that the electronic device restores factory settings, and the electronic device enters the recovery mode after being restarted. For another example, when the electronic device is in a powered-off state, the user may simultaneously press and hold a power button and a volume up button (or a volume down button), to enable the electronic device to enter the recovery mode. Specifically, after receiving an operation (an operation of selecting an option of restoring factory settings in a system setting, or an operation of simultaneously pressing and holding a power button and a volume up button (or a volume down button)) performed by a user to restore factory settings, the electronic device may write into an operation identifier. The operation identifier is used to prompt the electronic device to restart and enter the recovery mode, and instruct the electronic device to restore factory settings or erase data.

Figure 5:
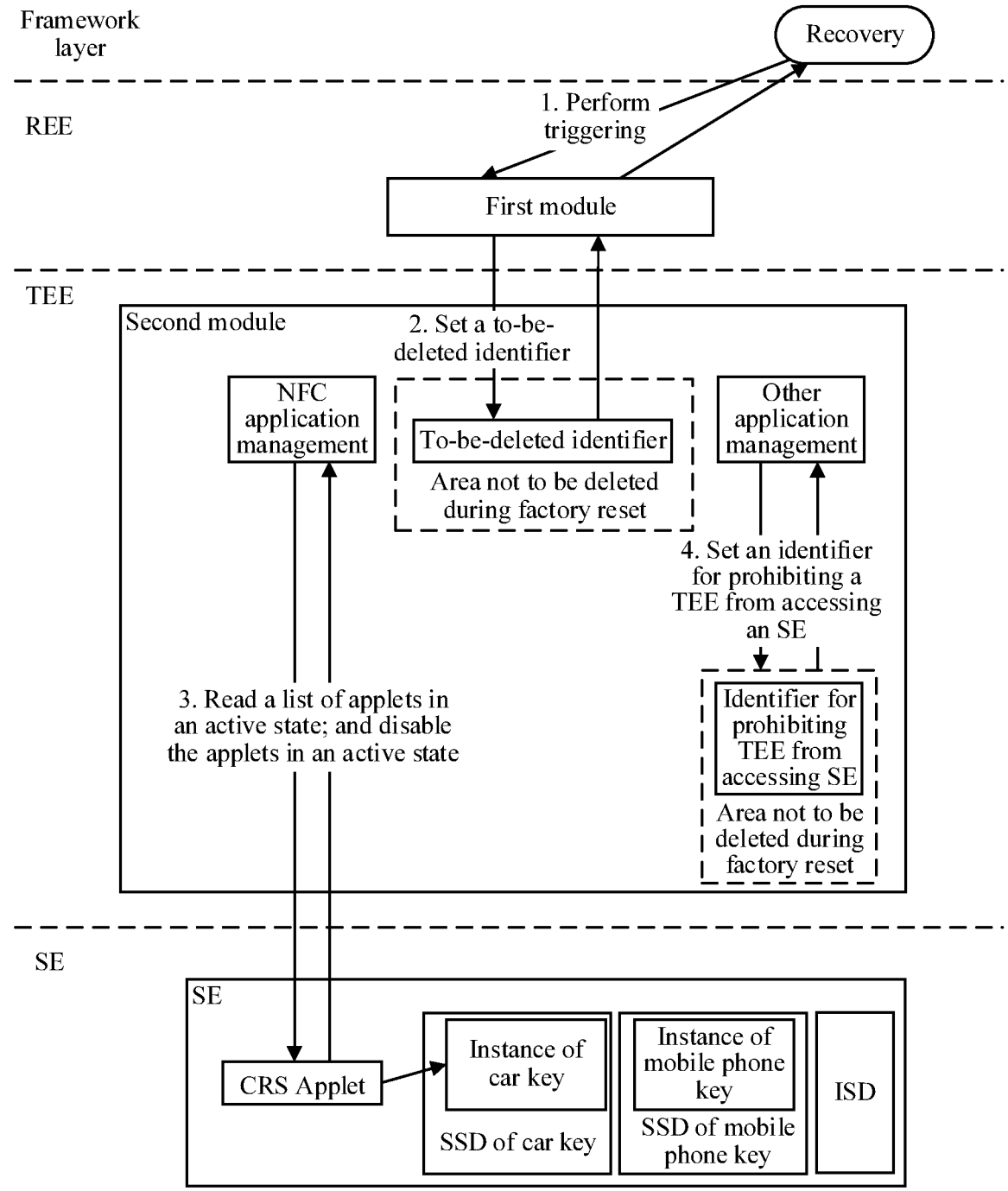
FIG. 5 is a schematic diagram of still another method for setting a to-be-deleted identifier according to an embodiment of this application.

It should be noted that the electronic device may alternatively enter the recovery mode in some other cases, for example, when a failure occurs in a mobile phone, the system automatically starts to restore factory settings. Alternatively, in a scenario in which some applications in the mobile phone erase data in the electronic device, the electronic device is also instructed to enter the recovery mode. A process of witting into the operation identifier by an electronic device is similar to the foregoing process, and details are not described again. A specific manner and a specific scenario in which the electronic device enters the recovery mode are not limited in this embodiment of this application. For example, as shown in FIG. 5, a first module may be disposed in an REE of the electronic device, configured to detect whether the electronic device enters the recovery mode and whether the electronic device is instructed to restore factory settings or erase data. A second module may further be disposed in the TEE and is configured to configure the to-be-deleted identifier and the like. The first module and the second module may be modules added in the electronic device to implement a function of deleting a safety service provided in this application, or may be corresponding functions added by using an existing module. For example, the first module may be a CA managing an SE, and the second module may be a TA managing the SE. This is not limited in this application.

For example, after the electronic device enters the recovery mode, the first module is notified. After learning that the electronic device enters the recovery mode, the first module instructs the second module to start to configure the to-be-deleted identifier. Alternatively, after detecting that the electronic device enters the recovery mode, the first module instructs the second module to start to configure the to-be-deleted identifier. That is, step S102 is performed.

It should be noted that when the electronic device restores factory settings, after entering the recovery mode, user data on the electronic device is deleted according to a specific process, including an account, a system setting, an application setting, an installed applications, and the like. The deleted applications include a CA in the REE of the electronic device and a TA in the TEE. In some examples, the first module and the second module in this application are also cleared. Therefore, the method for setting the to-be-deleted identifier provided in this application needs to be performed after the electronic device enters the recovery mode and before the first module and the second module are cleared.

S102. If the electronic device includes a secure element SE, perform step S103. Otherwise, the process ends.

In some examples of this application, the electronic device (for example, the second module) may first obtain an SE list (for example, cplcData data, the data is a chip identifier of the SE) of the electronic device from an operating system (Operating System, OS) of the TEE by using, for example, a TEE SE API (a standard interface of Android). It is determined whether the electronic device includes an SE and a quantity of SEs according to the obtained SE list. If it is determined that the electronic device includes the SE, it is determined that the to-be-deleted identifier needs to be set; otherwise, the to-be-deleted identifier does not need to be set.

In some other examples of this application, the electronic device may alternatively dispose the first module and the second module in an electronic device including the SE, and do not dispose the first module and the second module in an electronic device not including the SE. In this case, after the first module detects that the electronic device enters the recovery mode, step S103 may directly be performed without determining whether the electronic device includes the SE.

S103. The electronic device sets a to-be-deleted identifier.

In some examples, as shown in FIG. 5, the electronic device (for example, the second module) may configure the to-be-deleted identifier in a non-deleted area in a TEE of the electronic device. The non-deletable area in the TEE of the electronic device means that data in the area is not erased when the electronic device restores factory settings, for example, a replay protected memory block (Replay Protected Memory Block, RPMB). In this way, after the electronic device is restarted or is connected to the Internet, the to-be-deleted identifier may still be accessed for a subsequent operation. In some other examples, the to-be-deleted identifier may further be configured in the SE in the electronic device. When the electronic device restores factory settings, data in the SE is not erased. In this way, after the electronic device is restarted or is connected to the Internet, the to-be-deleted identifier may still be accessed for a subsequent operation.

For example, the to-be-deleted identifier may be 0 by default, or when the to-be-deleted identifier is default, it indicates that the SE in the electronic device is not restored to factory settings, or the SE does not need to be restored to factory settings. When the to-be-deleted identifier is configured, for example, the to-be-deleted identifier may be configured as 1, it indicates that the SE in the electronic device needs to be restored to factory settings, or the electronic device has an SSD that can be deleted.

In some examples, a to-be-deleted identifier may be configured for the electronic device. That is, when the to-be-deleted identifier of the electronic device is configured, it indicates that a subsequent operation may be performed on applets and SSDs in all SEs in the electronic device. In some other examples, the to-be-deleted identifier may also be configured by using an SE as a unit, that is, each SE that needs to be restored to factory settings is configured with one to-be-deleted identifier. When a to-be-deleted identifier of an SE is configured, it indicates that the electronic device may perform a subsequent operation on all applets and SSDs in the SE. In still other examples, the to-be-deleted identifier may alternatively configured by using an applet (or SSD) as a unit, that is, the second module configures a to-be-deleted identifier for each applet (or SSD) that needs to be deleted. When to-be-deleted identifiers of all applets (or SSDs) are configured, it indicates that the electronic device may perform a subsequent operation on all applets and SSDs in the SE. This is not limited in this embodiment of this application.

According to the method provided in the embodiments of this application, an SSD and an applet of a safety service are deleted according to a to-be-deleted identifier after a cell phone is powered on or connected to the Internet. Therefore, before the electronic device deletes the SSD and the applet of the safety service, applets of some safety services (such as a car key, an access card, and a bus card) may still directly interact with an external card reader through an NFC to implement corresponding functions, resulting in security risks. Therefore, to further ensure the security of the electronic device, after step S102, an NFC function of the safety service may be further prohibited, that is, step S104 is performed as follows:

S104. The electronic device obtains a list of applets of which an NFC function is in an activated state, and deactivates (deactivate) the NFC function of the applets in the list.

For example, as shown in FIG. 5, the second module may send a GET STATUS command to a CRS applet in the SE, to obtain a list of applets of which an NFC function is in an activated state in the SE. The CRS applet is an application that manages the NFC function of each applet in the SE, and is responsible for activating (activate) and deactivating (deactivate) the NFC function of each applet. Then, the second module sends a SET STATUS command to the CRS applet, and the CRS applet prohibits the NFC function of the applets in the list, that is, the NFC function of the applets is in a deactivated state. In this way, these applets cannot respond to an NFC command sent by an external card reader. Therefore, corresponding functions cannot be implemented, thereby ensuring data the security of the applet.

It should be noted that step S104 may be performed before, after, or simultaneously with step S103. This is not limited in this embodiment of this application.

In addition, before the electronic device does not delete the SSD and the applet of the safety service, applets of some safety services (for example, an applet of a cell phone key) may still be possibly invoked by the TEE, resulting in security risks. Therefore, to further ensure the security of the electronic device, after step S102, the TEE may further be prohibited from accessing the SE, that is, step S105 is performed as follows:

S105. The electronic device configures an identifier for prohibiting a TEE from accessing the SE, so that a TA in the TEE cannot send a command to the SE.

The identifier for prohibiting the TEE from accessing the SE may be stored in a non-deletable area in the TEE of the electronic device, for example, RPMB.

In some examples, before accessing the SE, all TAs in the TEE of the electronic device first access a TA managing the SE, and access the SE by using the TA managing the SE. In this way, the second module may notify the TA managing the SE, and the TA managing the SE configures the identifier for prohibiting the TEE from accessing the SE. In some other examples, the second module may also be a TA managing the SE. In this case, the second module may configure the identifier for prohibiting the TEE from accessing the SE. In this way, before accessing the SE, the TA in the TEE first queries the identifier for prohibiting the TEE from accessing the SE. If the identifier is configured, access to the SE is not allowed; or if the identifier is not configured, access to the SE is allowed.

It should be noted that step S105 may be performed before, after, or simultaneously with step S103. This is not limited in this embodiment of this application.

Subsequently, after detecting that the electronic device is powered on or connected to the Internet, the electronic device reads the to-be-deleted identifier. If the to-be-deleted identifier is configured, the electronic device triggers factory setting restoration of the SE, that is, clean the applet and the SSD in the SE. A specific implementation process is described in detail below.

Figure 6:
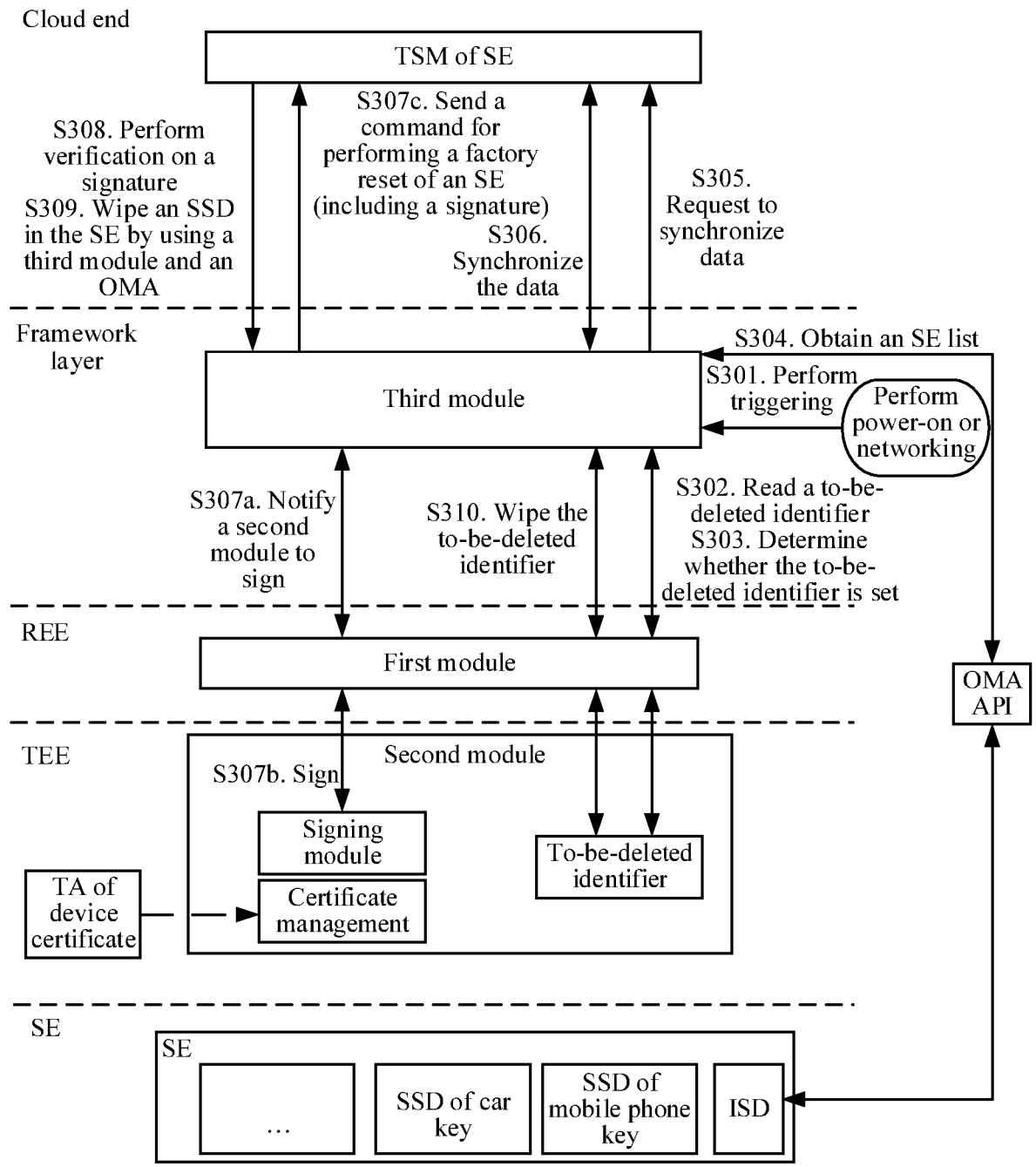
FIG. 6 is a schematic diagram of still another method for deleting a safety service in an SE according to an embodiment of this application.

FIG. 6 is a schematic flowchart of deleting a safety service according to an embodiment of this application. The method specifically includes the following steps.

S301. Detect that an electronic device is powered on or connected to the Internet.

In some examples, a third module may be disposed at a framework layer of the electronic device, and is configured to detect whether the electronic device is powered on or detect a broadcast message sent when the electronic device is connected to the Internet. The third module may be a newly added module, or may be a corresponding function added to an existing module. For example, the third module may also be a corresponding function added to an existing module (which may also be referred to as a service for managing the SE) in the framework layer of the electronic device. This is not specifically limited in this embodiment of this application. This is not limited in this embodiment of this application.

In some other examples, before step S301, the electronic device clears a CA in an REE and a CA in a TEE in the recovery mode, including a first module and a second module. The electronic device is powered off or restarted after all processes of recovery are executed. When the electronic device is restarted, the electronic device reads corresponding data and programs from a read only memory (read only memory, ROM) image (a copy of recording ROM chip data), to complete services and programs that need to be installed when the electronic device is powered on. The services and programs include the third module at the framework layer, the first module in the REE, and the second module in the TEE. In other words, step S301 and the subsequent steps are performed after the electronic device performs the recovery and restarts, and the third module, the first module, and the second module are installed.

In still some examples, in the method provided in this application, an applet and an SSD in the SE can be deleted only after the electronic device is connected to a cloud server, that is, a TSM of an SE issuer (hereinafter referred to as the TSM of the SE for short). Therefore, the third module may first determine whether the electronic device can be connected to the TSM of the SE. Step S302 is performed only after it is determined that the the electronic device can be connected to the TSM of the SE. This is not limited in this embodiment of this application.

S302. The electronic device reads a to-be-deleted identifier.

In some examples, the to-be-deleted identifier is stored in the second module, and the third module may read the to-be-deleted identifier from the second module through the first module.

In some other examples, the to-be-deleted identifier is stored in the SE in the electronic device, and the third module may read the to-be-deleted identifier from the SE through the first module and the second module.

S303. Determine whether the to-be-deleted identifier is configured. If the to-be-deleted identifier is configured, step S304 is performed; otherwise, the process ends.

S304. The electronic device obtains an SE list.

In some examples, the third module may obtain the SE list from an SE through a related technology specified in an open mobile alliance (open mobile alliance, OMA) protocol, and determine, according to the obtained SE list, whether the electronic device includes an SE and a quantity of SEs. In this application, if there are a plurality of SEs in the electronic device, an SSD on each SE needs to be erased for each SE, that is, a factory setting of each SE is restored.

S305. If the electronic device can be connected to a TSM of an SE issuer, the electronic device sends a request to the TSM of the SE according to the SE list, to request the TSM of the SE to synchronize data with each SE. If the electronic device cannot be connected to the TSM of the SE, this process ends.

In some examples, when the electronic device can be connected to the TSM of the SE, the electronic device may further request the TSM of the SE to generate an operand (operand) (or a random number), so that during subsequent data communication between the electronic device and the TSM of the SE, the operand may be used to prevent a playback attack, thereby ensuring data security. S306. The TSM of the SE synchronizes data with each SE, to obtain an SSD installed in the each SE and applet information of the each SSD.

A TSM of the SE is responsible for creating an SSD for a safety service in the SE, and a TSM of service specifically installs an applet of the safety service in the SSD. Therefore, the TSM of the SE is not aware of the installation of the applet in the SSD. According to a basic global platform (Global Platform, GP) of the SE, when deleting the SSD of the safety service, the TSM of the SE needs to delete the applet in the SSD first. Therefore, the TSM of the SE needs to synchronize data with the SE to obtain applet information in each SSD in the SE, so that the applet and the SSD can be deleted. S307. The electronic device sends a command for restoring factory settings of the SE to the TSM of the SE, the command for restoring factory settings of the SE including a signature.

For example, the third module may instruct, by using the first module, the second module to sign. The third module sends the command for restoring factory settings of the SE to the TSM of the SE. The command carries signed data. S307a, S307b, and S307c are respectively shown in FIG. 6.

In some examples of this application, when signing, the second module may use a private key to sign to-be-signed data. In some examples, the second module may sign an operand, to prevent a replay attack and ensure data security. The second module may further sign cplcData. When the electronic device includes two or more SEs, the second module may separately sign for each SE, that is, a chip identifier of the each SE corresponds to a signature. This application may further include another method for restoring factory settings of the SE. Therefore, the second module may further sign a resetVersion. The resetVersion indicates a version number of the SE to be restored to factory settings, and can be used to identify different methods for factory settings restoration of the SE. In this application, the reset-Version may be set to a fixed value, for example, "01".

After the signing, the second module returns the signed data, a public key certificate of the second module, and a device public key certificate to the third module. Optionally, the second module may return the signed data, the public key certificate of the second module, and the device public key certificate to the third module in one message, or may return the signed data, the public key certificate of the second module, and the device public key certificate to the service for managing the SE in a plurality of messages. This is not limited in this application.

In some other examples of this application, when the second module starts, the public key certificate of the second module may be first checked. If there is not the public key certificate of the second module, the following method may be used to generate the public key certificate of the second module and obtain the device public key certificate.

1. The second module creates a private-public key pair.
2. The second module makes a public key certificate of the second module through an interface of a TA of the device certificate and saves the certificate.
3. The second module obtains a public key certificate (that is, the device public key certificate) of the TA of the device certificate through the interface of the TA of the device certificate.

In still some examples of this application, the electronic device may separately send, for each SE as a unit, a corresponding command for restoring factory settings of the SE. For example, there are two SEs in the electronic device, that is, an SE1 and an SE2. After the foregoing process is performed, the electronic device sends a command 1 to request to restore factory setting of the SE1, and send command 2 to request to restore factory settings of the SE2.

S308. The TSM of the SE verifies whether the command for restoring factory settings of the SE is valid. If yes, step S309 is performed; otherwise, the process ends.

The TSM of the SE checks whether data in the signature is correct and whether the signature is correct. Specifically, a step of verifying the signature is as follows:
1. The TSM of the SE uses a public key of the authorization center to decompress the device public key certificate to obtain a device public key.
2. The TSM of the SE uses the device public key to decompress the public key certificate of the second module to obtain a public key of the second module.
3. The TSM of the SE uses the public key of the second module to check whether the signature data in the command for restoring factory settings of the SE is correct. If yes, it indicates that access to the current electronic device is valid, data in the signature is not tampered with, and the command for restoring factory settings of the SE may be executed. Otherwise, the access is invalid, and the command for restoring factory settings of the SE cannot be executed.

S309. The TSM of the SE deletes the SSD in the SE according to a locally stored service SSD configuration list.

The service SSD configuration list is determined by a manufacturer or a management party of the SE through negotiation with a service party. The list includes a list of SSDs that the manufacturer or the management party of the SE may delete some safety services of the service party by itself when the electronic device restores factory settings.

In step S306, the TSM of the SE has obtained the SSD installed in the electronic device and the applet installed in the each SSD. In this step, the electronic device may determine, according to the service SSD configuration list, an SSD that may be deleted when factory settings are restored in the SSDs installed in the electronic device, that is, determine a target SSD.

Then, the TSM of the SE may send an application protocol data unit (application protocol data unit, APDU) command (a processing command of the SE) to the SE through the third module and an OMA API, and delete an applet in the target SSD in the each SE and the target SSD one by one, to restore factory settings of the SE. The following describes a process of restoring factory settings of an SE module by using an example in which an SE is restored to factory settings.
1. A TSM of the SE establishes a secure channel with an ISD of the SE.
2. The TSM of the SE delivers one by one through the secure channel, a command for deleting target SSDs. An applet in the target SSD is deleted first and then the target SSD is deleted.

When the TSM of the SE deletes the target SSDs one by one, if a target SSD fails to be deleted, the TSM continues to delete other target SSDs. After the TSM of the SE deletes all the target SSDs, if there is a target SSD that fails to be deleted, the TSM of the SE returns an error code to the third module of the electronic device. After receiving the error code, the third module initiates an operation of restoring factory settings of the SE, that is, steps S307 to S309 are performed. It should be noted that, to avoid that the TSM of the SE encounters an infinite loop when restoring factory settings of the SE because one or more target SSDs fail to be deleted, a quantity of times that the third module reinitiates the operation of restoring factory settings of the SE may be set. In other words, after the quantity of times that the third module reinitiates the operation of restoring factory settings of the SE reaches a preset quantity, step S310 is directly performed.

In some examples, the TSM of the SE may reinitiate deletion of all target SSDs, or reinitiate deletion of a target SSD that fails to be deleted. This is not limited in this application.

In some other examples of this application, the third module may further perform other special processing on the safety service before step S310. For example, for a bus card, the third module may interact with a TSM of a bus card service, and report a balance of the bus card to the TSM of the bus card service, so as to transfer the balance to another bus card.

S310. The electronic device erases the to-be-deleted identifier.

In some examples, the to-be-deleted identifier is stored in the second module, and the third module may instruct, through the first module, the second module to erase the to-be-deleted identifier. In some other examples, the to-be-deleted identifier is stored in the SE in the electronic device, and the third module may instruct, through the first module and the second module, the SE to erase the to-be-deleted identifier.

In some other examples of this application, the second module configures an identifier for prohibiting the TEE from accessing the SE in the recovery mode, or the second module notifies a TA managing the SE that an identifier for prohibiting the TEE from accessing the SE is set. After step S310, the second module may clear the identifier for prohibiting the TEE from accessing the SE, or instruct the TA managing the SE to erase the identifier for prohibiting the TEE from accessing the SE, so that the TA in the TEE may access the SE.

Some electronic devices have a mechanism for managing an SE, including a service for managing an SE at a framework layer, a CA for managing an SE in an REE, and a TA for managing an SE in a TEE. In this case, an existing SE management mechanism may be used to cooperate with the first module added to the REE, the second module added to the TEE, and the third module added to the framework layer in this application, to jointly complete an operation of deleting an SSD in the SE. The following exemplarily describes specific implementation in the scenario.

For example, after the third module detects that the electronic device is powered on or connected to the Internet, the third module may read the to-be-deleted identifier from the second module in the TEE by using the first module in the REE. If the to-be-deleted identifier is set, the third module notifies a service for managing the SE, and triggers factory setting restoration of the SE, that is, clears the SSD in the SE. The specific implementation is as follows.

Figure 7:
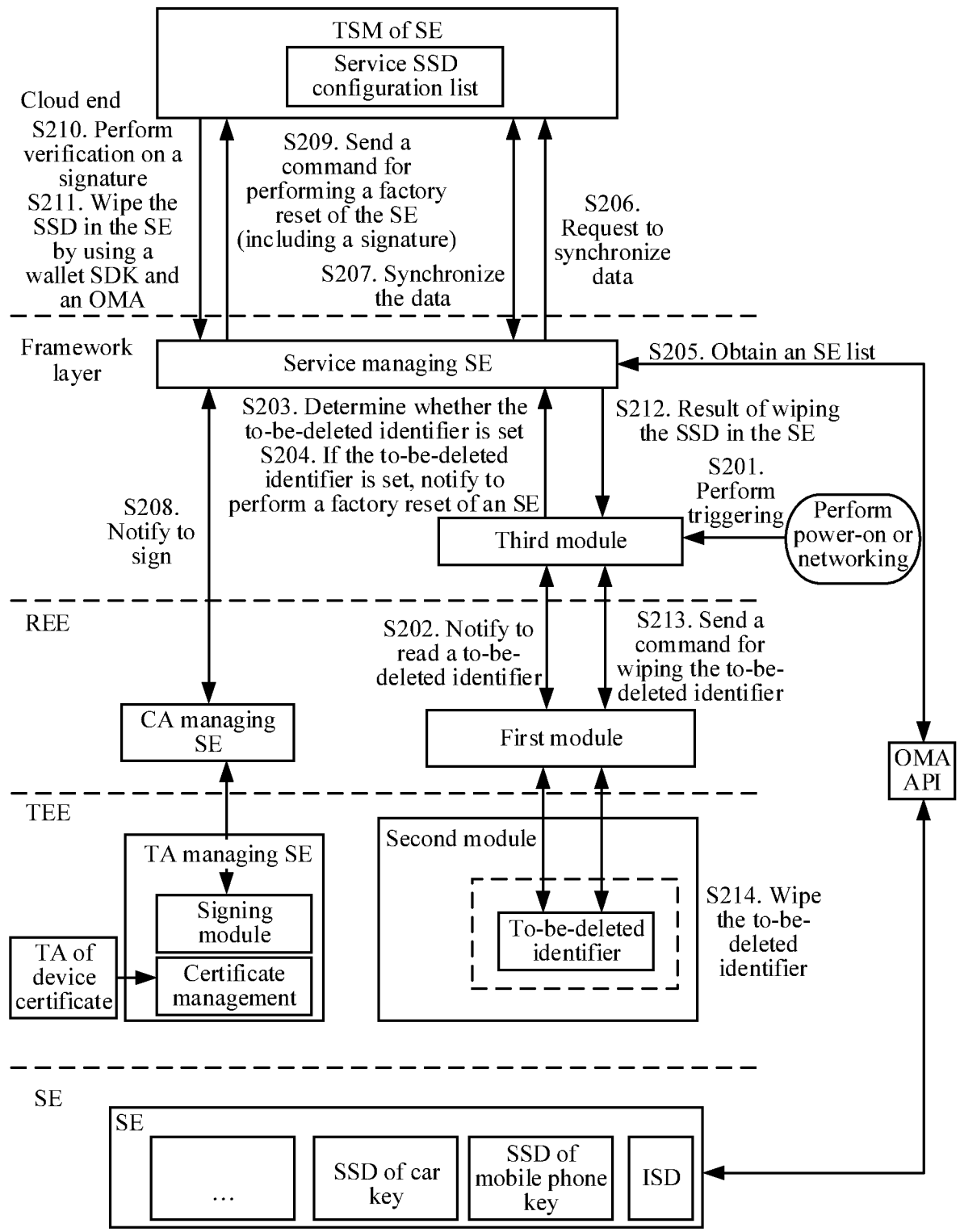
FIG. 7 is a schematic diagram of still another method for deleting a safety service in an SE according to an embodiment of this application.

FIG. 7 is a schematic flowchart of deleting a safety service according to an embodiment of this application. The method specifically includes the following steps.

S201. The third module detects that the electronic device is powered on or connected to the Internet.

S202. The third module reads and caches the to-be-deleted identifier.

In steps S201 and S202, when detecting that the electronic device is powered on or receiving a broadcast message sent when the electronic device is connected to the Internet, the third module at the framework layer reads the to-be-deleted identifier.

In some examples, the to-be-deleted identifier is stored in the second module, and the third module may read the to-be-deleted identifier from the second module through the first module, and cache the to-be-deleted identifier. In some examples, the to-be-deleted identifier is stored in the TA managing the SE, and the third module may read the to-be-deleted identifier from the TA managing the SE through the first module and the second module, and cache the to-be-deleted identifier. In some examples, the to-be-deleted identifier is stored in an SE module, and the third module may read the to-be-deleted identifier from the SE through the first module and the second module, and cache the to-be-deleted identifier. This is not limited in this embodiment of this application. In some other examples, in the method provided in this application, an applet and an SSD in the SE can be deleted only after the electronic device is connected to a cloud server, that is, a TSM of an SE issuer (hereinafter referred to as the TSM of the SE for short). Therefore, it may also be first determined whether the electronic device can be connected to the TSM of the SE. Only after it is determined that the electronic device can be connected to the TSM of the SE, the third module is triggered to read the to-be-deleted identifier and perform a subsequent operation. This is not limited in this embodiment of this application.

S203. The third module determines whether the to-be-deleted identifier is configured. If the to-be-deleted identifier is configured, step S204 is performed; otherwise, the process ends.

S204. The third module notifies a service for managing the SE that the SE needs to be restored to factory settings.

For example, after determining that the to-be-deleted identifier is configured, the third module notifies a service for managing the SE that the electronic device needs to restore factory settings of the SE, that is, delete an SSD in the SE.

In some examples, to prevent the case that when deleting the SSD in the SE, the electronic device needs to create a new SSD according to a command from the TSM of the SE and therefore results in confusion, the creation of a new SSD in the SE may be prohibited during a period when the to-be-deleted identifier is configured. That is, when the service for managing the SE receives a command that the TSM of the SE establishes a new security domain, the to-be-deleted identifier may be first read from the third module. If the to-be-deleted identifier is configured, the service for managing the SE does not create a new SSD.

S205. The service for managing the SE obtains the SE list.

In some examples, the service for managing the SE may obtain the SE list from the SE by using a related technology specified in an open mobile alliance (open mobile alliance, OMA) protocol, and determine, according to the obtained SE list, whether the electronic device includes an SE and a quantity of SEs. In this application, if there are a plurality of SEs, an SSD on each SE needs to be erased for each SE, that is, each SE needs to restore factory settings.

In some examples, when the electronic device can be connected to the TSM of the SE, the service for managing the SE may further request the TSM of the SE to generate an operand (operand) (or a random number), so that during subsequent data communication between the electronic device and the TSM of the SE, the operand may be used to prevent a playback attack, thereby ensuring data security. If the SE cannot be connected to the TSM, the process ends.

S206. If the electronic device can be connected to a TSM of an SE issuer, the service for managing the SE sends a request to the TSM of the SE according to the SE list, to request the TSM of the SE to synchronize data with the each SE. If the electronic device cannot be connected to the TSM of the SE, this process ends.

S207. The TSM of the SE synchronizes the data with the SE, to obtain an SSD installed in the each SE and applet information of the each SSD.

A TSM of the SE is responsible for creating an SSD for a safety service in the SE, and a TSM of service specifically installs an applet of the safety service in the SSD. Therefore, the TSM of the SE is not aware of the installation of the applet in the SSD. According to a basic global platform (Global Platform, GP) of the SE, when deleting the SSD of the safety service, the TSM of the SE needs to delete the applet in the SSD first. Therefore, the TSM of the SE needs to synchronize data with the SE to obtain information about the applet installed in the each SSD in the SE, so that the applet and the SSD can be deleted.

Specifically, the TSM of the SE may communicate with the SE through the service for managing the SE and an OMA API, to obtain information about the applet installed in the each SSD in the SE.

S208: The service managing the SE instructs, by using the CA managing the SE, the TA managing the SE to sign.

In this application, it is equivalent to that the electronic device initiates a request to the TSM of the SE for requesting to restore factory settings of the SE. To ensure security, the TSM of the SE requires the electronic device to sign an initiated request, and determines an identity of the electronic device according to signature data.

In some examples, the TA managing the SE signs to-be-signed data by using a private key. The TA managing the SE may sign the operand to prevent a playback attack, thereby ensuring data security. The TA managing the SE may also sign the cplcData. When the electronic device includes two or more SEs, the TA managing the SE may separately sign for each SE, that is, a chip identifier of the each SE corresponds to a signature. In some other examples, this application may further include another method for restoring factory settings of the SE, the TA managing the SE may further sign a resetVersion, where resetVersion indicates a version number for a factory reset of the SE, and can be used to identify different methods for a factory reset of the SE. In this application, resetVersion may be set to a fixed value, for example, "01".

After the TA managing the SE signs, the signed data, a public key certificate of the TA managing the SE, and a device public key certificate are returned together to the service for managing the SE. Optionally, the TA managing the SE may return the signature, the public key certificate of the TA managing the SE, and the device public key certificate to the service for managing the SE in one message, or may return the signature, the public key certificate of the TA managing the SE, and the device public key certificate to the service for managing the SE in a plurality of messages. This is not limited in this application.

In some other examples, when the TA managing the SE is started, the public key certificate of the TA managing the SE may be checked. If there is no public key certificate of the TA managing the SE, the public key certificate of the TA managing the SE may be generated and the device public key certificate may be obtained. For specific implementation, refer to related descriptions in the foregoing step S307. Details are not described again.

S209. The TA managing the SE sends a command for restoring factory settings of the SE to the TSM of the SE, the command for restoring factory settings of the SE including the signature data. For example, the service for managing the SE may separately send a corresponding command for restoring factory settings of the SE for the each SE. For example, a service for managing the SE manages two SEs in the electronic device, that is, an SE1 and an SE2 respectively. After the foregoing process is performed, the service for managing the SE sends a command 1 to request to restore factory settings of the SE1, and send command 2 to request to restore factory settings of the SE2.

S210. The TSM of the SE verifies whether the command for restoring factory settings of the SE is valid. If yes, step S211 is performed; otherwise, the process ends.

The TSM of the SE verifies whether data in a signature is correct and whether the signature is correct. For a specific method for verifying the signature, refer to related content in the foregoing step 308. Details are not described again.

S211. The TSM of the SE deletes the SSD in the SE according to a locally stored service SSD configuration list.

For example, the TSM of the SE determines, according to the locally stored service SSD configuration list and the information about the SSD and the applet installed on the electronic device that are obtained in step S207, an SSD that can be deleted during factory setting restoration in the SSD installed in the electronic device, that is, determines a target SSD.

Then, the TSM of the SE may send an application protocol data unit (application protocol data unit, APDU) command (a processing command of the SE) to the SE through the service for managing the SE and an OMA API, to delete a target applet and a target SSD in each SE one by one, so as to restore factory settings of the SE.

In some other examples of this application, the service for managing the SE may further perform other special processing on the safety service before step S212. For example, for a bus card, the service for managing the SE may interact with a TSM of a bus card service, and report a balance of the bus card to the TSM of the bus card service, to transfer the balance to another bus card.

For other content of this step, refer to related descriptions in step S309 in the foregoing text. Details are not described herein again.

S212. The service managing the SE returns a result of restoring factory settings of the SE to the third module.

S213. The third module sends, through the first module, a command for erasing the to-be-deleted identifier to the second module.

S214. The second module erases the to-be-deleted identifier.

In some examples, if the to-be-deleted identifier is stored in the second module, the second module erases the to-be-deleted identifier. In some other examples, if the to-be-deleted identifier is stored in the TA managing the SE, the second module may indicate the TA managing the SE to erase the to-be-deleted identifier. In still other examples, if the to-be-deleted identifier is stored in the SE module, the second module may indicate the SE to erase the to-be-deleted identifier. This is not limited in this embodiment of this application.

In some examples of this application, the TA managing the SE configures, in the recovery mode, an identifier for prohibiting the TEE from accessing the SE. After step S213, the second module may notify the TA managing the SE to erase the identifier for prohibiting the IbE from accessing the SE, so that the TA in the TEE can access the SE.

It may be understood that, to implement the foregoing functions, the foregoing terminal includes a corresponding hardware structure and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In this embodiment, function modules of the electronic device may be obtained through division according to the foregoing method examples. For example, the function modules may be obtained through division corresponding to various functions, or two or more functions may be integrated into one processing module. The integrated module may be implemented in a form of hardware, or may be implemented in a form of a software functional module. It should be noted that, in this embodiment of the present invention, module division is exemplary, and is merely a logical function division. In actual implementation, another division manner may be used.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
    receiving an instruction for wiping data or performing a factory reset;

setting, in response to receiving the instruction, a first identifier for sending a first request to delete a first security service from a secure element (SE) of an electronic device;
storing the first identifier in a first area that is not deleted after wiping the data or performing the factory reset, wherein the first area comprises a trusted execution environment (TEE) of the electronic device or the SE of the electronic device;
shutting down or restarting the electronic device after setting the first identifier;
reading the first identifier when the electronic device is powered on or is connected to a network;
sending, to a server in response to reading the first identifier, the first request requesting to delete the first security service from the SE;
receiving, from the server according to the first request, a first command instructing to delete a target security service in the SE, wherein the target security service is based on a second security service installed in the SE and based on a list of deletable third security services stored in the server;
deleting, from the SE according to the first command, a secure element applet corresponding to the target security service; and
deleting, after deleting the secure element applet from the SE, the first identifier from the TEE of the electronic device or the SE of the electronic device.

2. The method of claim 1, further comprising deleting, from the SE according to the first command, a supplementary security domain (SSD) corresponding to the target security service.

3. The method of claim 2, further comprising:
setting, based on the instruction, a second identifier; and
denying, using a trusted application (TA) that is in the TEE of the electronic device and that manages the SE and based on the second identifier, access of a service TA to the SE.

4. The method of claim 3, further comprising storing the second identifier in a second area in the TEE, wherein the second area is not to be deleted after wiping the data or performing the factory reset.

5. The method of claim 3, wherein after deleting the secure element applet or the SSD, the method further comprises wiping the second identifier.

6. The method of claim 2, further comprising reporting, to the server, the SSD and the secure element applet.

7. The method of claim 1, further comprising disabling a Near-Field Communication (NFC) function of the secure element applet in the electronic device.

8. The method of claim 1, further comprising receiving, from a rich execution environment (REE), a command for deleting the first identifier from the TEE of the electronic device or the SE of the electronic device.

9. The method of claim 8, wherein deleting the first identifier further comprises deleting, in response to receiving the command, the first identifier from the TEE of the electronic device or the SE of the electronic device.

10. An apparatus, comprising:
a memory configured to store computer-executable instructions; and
one or more processors coupled to the memory and configured to execute the computer-executable instructions to:
install a plurality of first security services and a plurality of first secure element applets corresponding to the first security services;
receive an instruction for wiping data or performing a factory reset;
set, in response to receiving the instruction, a first identifier for sending a first request to delete a second security service from a secure element (SE) of the apparatus;
store the first identifier in a first area that is not deleted after wiping the data or performing the factory reset, wherein the first area comprises a trusted execution environment (TEE) of the apparatus or the SE of the apparatus; reset;
shut down or restart the apparatus after setting the first identifier;
read the first identifier when the apparatus is powered on or is connected to a network;
send, to a server, the first request requesting to delete the second security service from the SE in response to reading the first identifier;
receive, from the server according to the first request, a first command instructing to delete a target security service in the SE, wherein the target security service is based on the first security services and a list of deletable third security services stored in the server;
delete, from the SE according to the first command, a second secure element applet corresponding to the target security service; and
delete, after deleting the second secure element applet from the SE, the first identifier from the TEE of the apparatus or the SE of the apparatus.

11. The apparatus of claim 10, wherein the one or more processors are further configured to delete, from the SE according to the first command, a supplementary security domain (SSD) corresponding to the target security service.

12. The apparatus of claim 11, wherein the one or more processors are further configured to report, to the server, the SSD and the second secure element applet.

13. The apparatus of claim 10, wherein the one or more processors are further configured to:
set, based on the instruction, a second identifier; and
deny, using a trusted application (TA) that is in the TEE of the apparatus and that manages the SE and based on the second identifier, access of a service TA to the SE.

14. The apparatus of claim 13, wherein the one or more processors are further configured to store the second identifier in a second area in the TEE, and wherein the second area is not to be deleted after wiping the data or performing the factory reset.

15. The apparatus of claim 13, wherein after deleting the second secure element applet or a supplementary security domain (SSD), the one or more processors are further configured to wipe the second identifier.

16. The apparatus of claim 10, wherein the one or more processors are further configured to disable a Near-Field Communication (NFC) function of the second secure element applet in the apparatus.

17. The apparatus of claim 10, wherein the one or more processors are further configured to execute the computer-executable instructions to receive, from a rich execution environment (REE), a command for deleting the first identifier from the TEE of the apparatus or the SE of the apparatus.

18. The apparatus of claim 17, wherein the one or more processors are further configured to execute the computer-executable instructions to delete, in response to receiving the command, the first identifier from the TEE of the apparatus or the SE of the apparatus.

19. A computer program product comprising computer-executable instructions stored on a non-transitory computer-readable medium that, when executed by one or more processors, cause an apparatus to:
- receive an instruction for wiping data or performing a factory reset;
- set, in response to receiving the instruction, a first identifier for sending a first request to delete a first security services from a secure element (SE) of the apparatus;
- store the first identifier in a first area that is not deleted after wiping the data or performing the factory reset, wherein the first area comprises a trusted execution environment (TEE) of the apparatus or the SE of the apparatus;
- shut down or restart the apparatus after setting the first identifier;
- read the first identifier when the apparatus is powered on or is connected to a network;
- send, to a server in response to reading the first identifier, the first request requesting to delete the first security service from the SE;
- receive, from the server according to the first request, a first command instructing to delete a target security service in the SE, wherein the target security service is based on a second security service installed in the SE and a list of deletable third security services stored in the server;
- delete, from the SE according to the first command, a secure element applet corresponding to the target security service;
- delete, after deleting the secure element applet from the SE, the first identifier from the TEE of the apparatus or the SE of the apparatus.

20. The computer program product of claim 19, wherein the one or more processors are further configured to execute the computer-executable instructions to:
- receive, from a rich execution environment (REE), a command for deleting the first identifier from the TEE of the apparatus or the SE of the apparatus; and
- delete, in response to receiving the command, the first identifier from the TEE of the apparatus or the SE of the apparatus.

* * * * *

UNITED STATES PATENT AND TRADEMARK OFFICE
CERTIFICATE OF CORRECTION

PATENT NO. : 12,013,759 B2
APPLICATION NO. : 17/292164
DATED : June 18, 2024
INVENTOR(S) : Zhuofei Li, Min Peng and Gaosheng Yin Page 1 of 1

It is certified that error appears in the above-identified patent and that said Letters Patent is hereby corrected as shown below:

In the Claims

Claim 10, Column 32, Line 11: "apparatus; reset;" should read "apparatus;"

Claim 19, Column 34, Line 9: "service;" should read "service; and"

Signed and Sealed this
Sixth Day of August, 2024

Katherine Kelly Vidal
*Director of the United States Patent and Trademark Office*